(12) United States Patent  
Sugiyama et al.

(10) Patent No.: US 8,727,292 B2  
(45) Date of Patent: May 20, 2014

(54) IMAGE READING SYSTEM USING AN ANGLE ADJUSTMENT DEVICE

(75) Inventors: Namie Sugiyama, Shizuoka (JP); Keisuke Hatomi, Tokyo (JP)

(73) Assignees: NEC Access Technica, Ltd., Shizuoka (JP); NEC Engineering Ltd., Tokyo (JP)

( * ) Notice: Subject to any disclaimer, the term of this patent is extended or adjusted under 35 U.S.C. 154(b) by 20 days.

(21) Appl. No.: 13/444,331

(22) Filed: Apr. 11, 2012

(65) Prior Publication Data

US 2012/0193495 A1   Aug. 2, 2012

Related U.S. Application Data

(62) Division of application No. 12/408,269, filed on Mar. 20, 2009, now abandoned.

(30) Foreign Application Priority Data

Apr. 9, 2008  (JP) ................................. 2008-101853

(51) Int. Cl.
| | |
|---|---|
| *E04G 3/00* | (2006.01) |
| *A47F 5/00* | (2006.01) |
| *F16D 3/00* | (2006.01) |
| *B23Q 3/04* | (2006.01) |
| *B25B 1/04* | (2006.01) |

(52) U.S. Cl.  
USPC .............. 248/292.13; 248/299.1; 248/292.12; 403/94; 403/111; 269/136; 269/139

(58) Field of Classification Search  
USPC ..................... 269/71, 136, 139; 403/111, 84; 248/299.1, 292.12, 292.14  
See application file for complete search history.

(56) References Cited

U.S. PATENT DOCUMENTS

| | | | |
|---|---|---|---|
| 213,775 A | | 4/1879 | Redman et al. |
| 702,304 A | | 6/1902 | Hoover et al. |
| 1,836,053 A | * | 12/1931 | Wagner ......................... 248/456 |
| 2,030,348 A | * | 2/1936 | Barrett .......................... 312/313 |
| 4,421,035 A | * | 12/1983 | Gubbe et al. ...................... 108/6 |
| 4,934,645 A | | 6/1990 | Breslow |

(Continued)

FOREIGN PATENT DOCUMENTS

| | | |
|---|---|---|
| CN | 1610496 | 4/2005 |
| JP | 43-004883 | 3/1968 |

(Continued)

OTHER PUBLICATIONS uhmwpe technical data, http://web.archive.org/web/20040414051832/http://k-mac-plastics.net/date%20sheets/uhmwpe_typical_properties.htm, Apr. 14, 2004.*

(Continued)

*Primary Examiner* — Joshua J Michener  
*Assistant Examiner* — Chiedu Chibogu  
(74) *Attorney, Agent, or Firm* — Young & Thompson

(57) ABSTRACT

An angle adjustment device, include a fixed portion; a movable portion; a connection portion which rotatably connects the movable portion to the fixed portion; and an elastic member which is arranged between the movable portion and the fixed portion and restricts rotational movement of the movable portion with kinetic friction generated between the movable portion and the fixed portion.

4 Claims, 28 Drawing Sheets

(56) References Cited

U.S. PATENT DOCUMENTS

| | | | |
|---|---|---|---|
| 5,109,572 A | | 5/1992 | Park |
| 5,228,873 A | * | 7/1993 | Hirai .................... 439/607.4 |
| 5,292,097 A | | 3/1994 | Russell |
| 5,765,794 A | | 6/1998 | Chen |
| 6,116,557 A | * | 9/2000 | Choy et al. ................ 248/286.1 |
| 6,296,217 B1 | | 10/2001 | Ikedo et al. |
| 6,353,968 B1 | * | 3/2002 | Shyu et al. .................... 16/334 |
| 6,354,549 B2 | * | 3/2002 | Sweere et al. ............ 248/292.14 |
| 6,354,552 B1 | * | 3/2002 | Chiu ............................ 248/422 |
| 6,378,830 B1 | * | 4/2002 | Lu ............................. 248/278.1 |
| 6,502,792 B1 | * | 1/2003 | Cho et al. ..................... 248/121 |
| 7,261,267 B2 | * | 8/2007 | Frydkj.ae butted.r .... 248/292.12 |
| 7,261,272 B2 | * | 8/2007 | Courbon ................... 248/475.1 |
| 7,267,312 B2 | | 9/2007 | Kang et al. |
| 7,335,119 B2 | | 2/2008 | White |
| 7,417,695 B2 | * | 8/2008 | Cheng ............................ 349/60 |
| 7,523,907 B2 | * | 4/2009 | Chen ....................... 248/292.12 |
| 7,679,892 B2 | * | 3/2010 | Jung ........................ 361/679.21 |
| 7,690,081 B2 | * | 4/2010 | Chern ............................ 16/342 |
| 7,694,922 B2 | | 4/2010 | Kim |
| 2003/0001057 A1 | * | 1/2003 | Sweere et al. ............. 248/276.1 |
| 2005/0103960 A1 | | 5/2005 | Kirchhoff |
| 2005/0205735 A1 | * | 9/2005 | Ichikawa et al. ......... 248/292.12 |
| 2006/0145038 A1 | | 7/2006 | Chen |
| 2006/0273228 A1 | | 12/2006 | Kollar |

FOREIGN PATENT DOCUMENTS

| | | |
|---|---|---|
| JP | 43-008854 | 4/1968 |
| JP | 51-081188 | 6/1976 |
| JP | 58-181876 | 12/1983 |
| JP | 60-052412 | 4/1985 |
| JP | 63-077122 | 5/1988 |
| JP | 3-051475 | 5/1991 |
| JP | 7-319396 | 12/1995 |
| JP | 2001-146874 | 5/2001 |
| JP | 2003-259048 | 9/2003 |
| JP | 3106739 | 1/2005 |
| JP | 2007-334157 | 12/2007 |

OTHER PUBLICATIONS

Japanese Patent Office issued a Japanese Office Action dated Feb. 24, 2010, Application No. 2008-101853.

First Office Action issued on Sep. 23, 2011 by State Intellectual Property Office, P.R. China with English Translation, 13 pages.

Chinese Office Action dated Nov. 5, 2012 in corresponding Chinese Patent Application No. 200910134173.1 with English translation of Chinese Office Action.

* cited by examiner

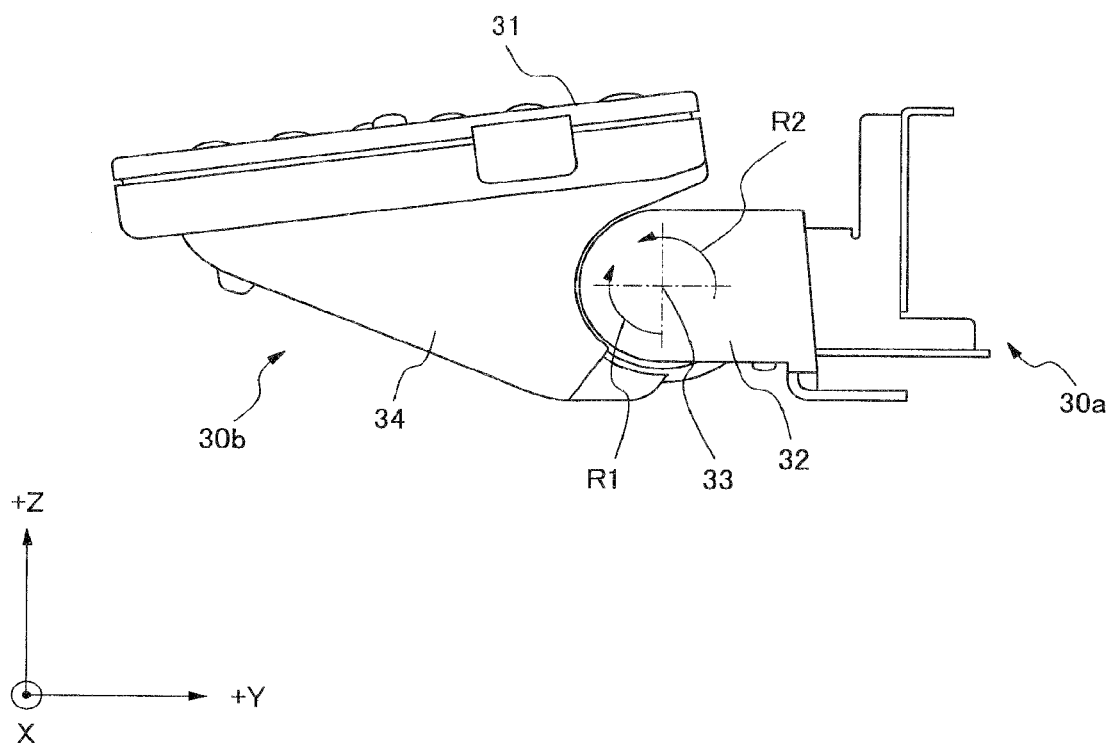

IMAGE READING SYSTEM USING AN ANGLE ADJUSTMENT DEVICE

CROSS REFERENCE TO RELATED APPLICATIONS

This application is a division of co-pending application Ser. No. 12/408,269 filed on Mar. 20, 2009, which claims foreign priority to Japanese Application No. 2008-101853 filed on Apr. 9, 2008. The entire content of each of these applications is hereby expressly incorporated by reference.

TECHNICAL FIELD

The present invention relates to an angle adjustment device and an image reading system.

BACKGROUND ART

An image reading system such as a facsimile machine and a copy machine has an operation panel operated by a user. The operation panel having an improved operability is needed and also it has to be designed with universal design.

In order to improve operability of the operation panel, a mechanism in which a tilt angle of the operation panel can be adjusted to suit preference of the user is proposed.

For example, Japanese Patent Application Laid-Open No. 2003-259048 discloses a support device for supporting a display panel which includes a rotary connection portion and an elastic member. If the display panel is set with a predetermined posture, an amount of deformation of the elastic member decreases. That is, deformation of the elastic member in the predetermined posture is smaller than the deformation before and after this posture. Accordingly, the display panel is kept in the predetermined posture.

Japanese Patent Application Laid-Open No. 2007-334157 proposes an image forming device in which a posture of an operation panel can be adjusted at multiple postures by a posture adjustment mechanism.

The posture adjustment mechanism includes a plurality of lock pins concentrically arranged around a rotating shaft and an engagement member composed of an elastic material engaging with the lock pins. One of the lock pin and the engagement member is provided on a main-body side of the image forming device, and the other is provided on an operation panel.

Accordingly, when the posture of the operation panel is changed, the engagement member is largely elastically deformed to engage with the lock pin. When the engagement member engages with the lock pin, an amount of elastic deformation of the engagement member becomes small. Therefore, the posture of the operation panel is kept as it is.

Japanese Patent Application Laid-Open No. 2001-146874 proposes a tilt mechanism in which a torque value changes when a display portion rotates.

The tilt mechanism includes a fixed side bracket having a rotation center hole and an elongate hole that is concentric with respect to the rotation center hole, and a rotation side bracket in which a shaft and a sub-shaft are provided. A plate thickness of the surrounding fixed side bracket of the elongate hole changes with position.

The shaft is inserted into the rotation center hole and the sub-shaft is inserted into the elongate hole. The rotation side bracket is fixed to the fixed side bracket by screwing a nut on the shaft and the sub-shaft with a friction body composed of a spring washer.

Therefore, when the rotation side bracket rotates with respect to the fixed side bracket, the torque value changes according to a plate thickness of the elongate hole part.

Japanese Patent Application Laid-Open No. 1995-319396 proposes a tilt mechanism in which a movable part of an operation display portion or the like on which external force or own weight acts can be firmly fixed and supported to a main-body at a desired angle.

The tilt mechanism includes a screw shaft, a spring, a joint part of the main-body and the joint part of the operation display. One end of the screw shaft is screwed into the main-body side, and the other end forms a knob.

An engagement slot is formed on a contact face between the joint part of the main-body and the joint part of the operation display. The joint part of the operation display is fixed to the operation panel.

The screw shaft is screwed into the main-body side while penetrating the spring, the joint part of the main-body and the joint part of the operation display.

According to a tilt degree of the joint part of the operation display for the joint part of the main-body, an engagement state of the engagement slot on both changes. And the deformation of the spring becomes the smallest when the engagement slot on both has geared completely.

Because the deformation of the spring becomes the smallest when the engagement slot on both has geared completely, the display panel is held at the posture at this time.

Above-mentioned patent documents describe that the posture of the operation panel can be set optionally and operability thereof is improved.

However, a breakage of the parts and degrading of quality might arise by the impact generated when changing the posture of the operation panel.

SUMMARY

An exemplary object of the present invention is to provide an angle adjustment device and an image reading system in which impacts which occur when a posture is changed can be suppressed.

An angle adjustment device, include a fixed portion; a movable portion; a connection portion which rotatably connects the movable portion to the fixed portion; and an elastic member which is arranged between the movable portion and the fixed portion and restricts rotational movement of the movable portion with kinetic friction generated between the movable portion and the fixed portion.

BRIEF DESCRIPTION OF THE DRAWINGS

Exemplary features and advantages of the present invention will become apparent from the following detailed description when taken with the accompanying drawings in which:

FIG. 7C is a side view of the operation panel in a third posture position;

EXEMPLARY EMBODIMENT

Exemplary embodiments of the present invention will now be described in detail in accordance with the accompanying drawings.

<First Exemplary Embodiment>

A first exemplary embodiment of the present invention will be described.

Figure 1:
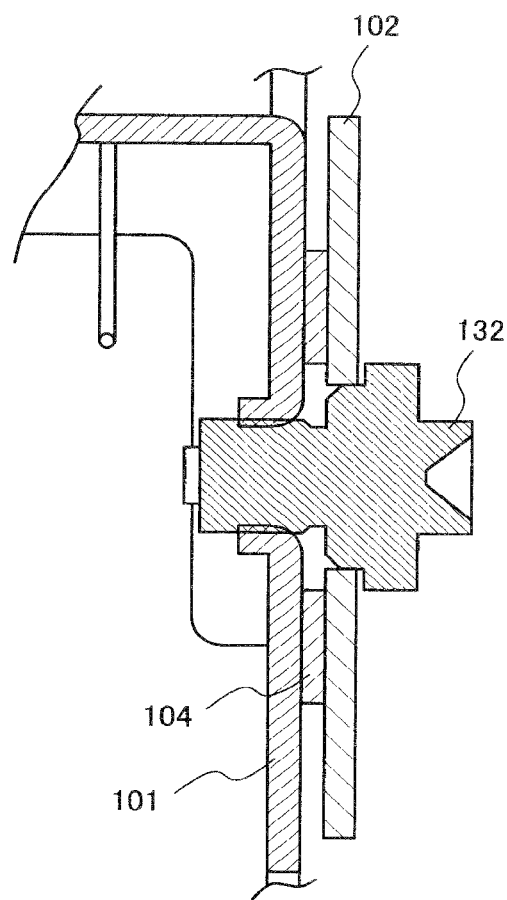
FIG. 1 is a fragmentary sectional view of an angle adjustment device according to a first exemplary embodiment.

FIG. 1 is a fragmentary sectional view of an angle adjustment device of an operation panel in an image reading system according to the first exemplary embodiment.

The angle adjustment device of the operation panel includes a fixed portion 101, a movable portion 102, a connection portion 132 and an elastic member 104. The fixed portion 101 is fixed on a chassis of the image reading system or the like.

The movable portion 102 can rotate with respect to the fixed portion 101. The connection portion 132 connects the fixed portion 101 and the movable portion 102. The elastic member 104 is arranged between the movable portion 102 and the fixed portion 101. A kinetic friction generated between the movable portion 102 and the fixed portion 101 restricts a rotational movement of the movable portion 102.

Accordingly, the image reading system can be provided in which an impact which is generated when a posture of the operation panel is changed is eased by restricting the rotational movement of the movable portion 102 with the kinetic friction.

<Second Exemplary Embodiment>

Next, a second exemplary embodiment of the present invention will be described.

Figure 2:
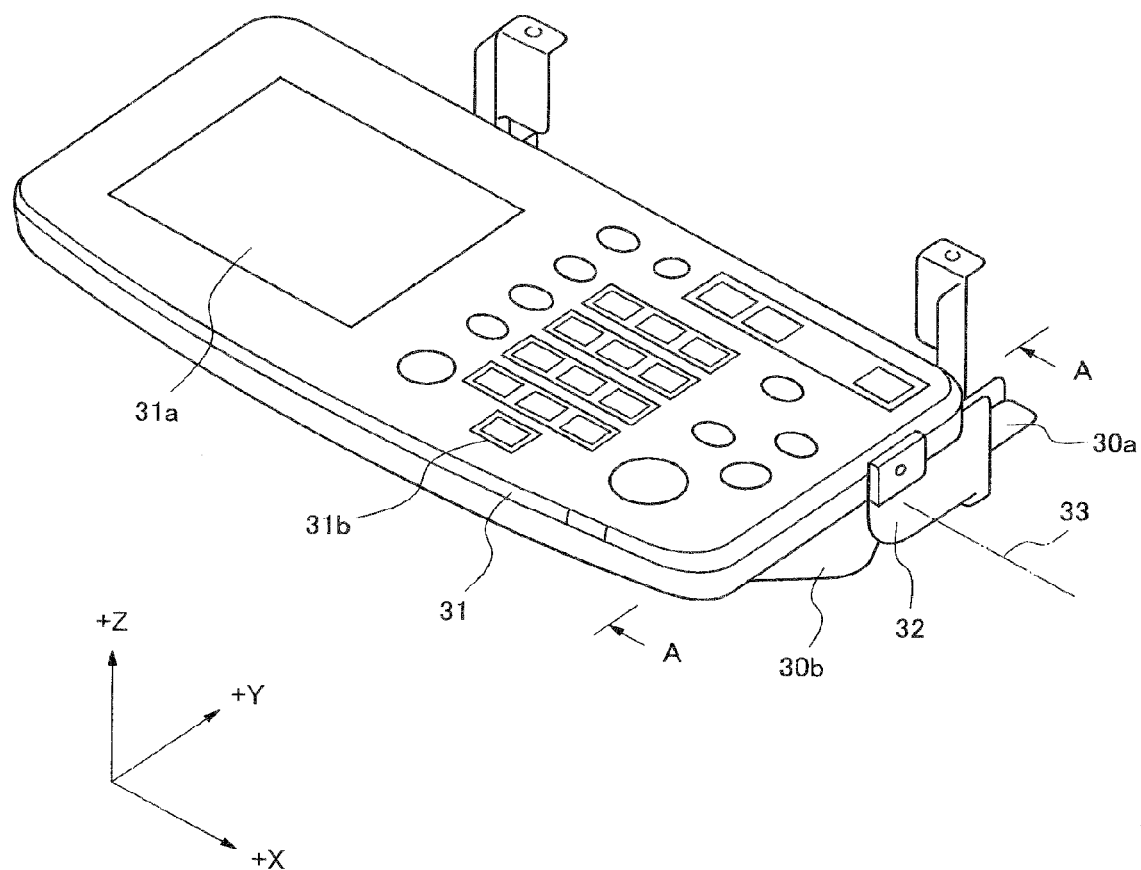
FIG. 2 is a perspective view showing an external appearance of an operation panel using an angle adjustment device according to a second exemplary embodiment.

FIG. 2 is a perspective view of an angle adjustment device of an operation panel according to the second exemplary embodiment. Further, for convenience of explanation, a longitudinal direction of the operation panel is defined as an X-axis, a depth direction of the operation panel is defined as a Y-axis, and a vertical direction of the operation panel is defined as a Z-axis. In FIG. 2, a panel surface of the operation panel is on an X-Y plane.

In a front view of the operation panel, a right hand side indicates a positive X(+X) direction, a left hand side indicates a negative X(−X) direction, a rear side indicates a positive Y(+Y) direction , a front side indicates a negative Y(−Y) direction, an upper side indicates a positive Z(+Z) direction , and a lower side indicates a negative Z(−Z) direction.

The angle adjustment device of the second exemplary embodiment is used for setting a posture of an operation panel 31 provided in an image reading system such as a facsimile machine and a copy machine.

As shown in FIG. 2, the angle adjustment device includes a fixed portion 30a and a movable portion 30b. The operation panel 31 is provided in the movable portion 30b. Namely, the movable portion 30b is fixed on a rear side of the operation panel 31.

The movable portion 30b is connected by using a connection portion 32 so as to rotate around an axis line 33 along the X-axis. The axis line 33 is a rotational axis of the movable portion 30b and also is a center axis of the connection portion 32. The connection portion 32 is fixed on the fixed portion 30a. The connection portion 32 is provided at both ends of the movable portion 30b in the X-axis direction.

Further, the operation panel 31 includes a panel portion 31a of a touch panel type liquid crystal display (LCD) device or the like and a key portion 31b such as an operation key or the like. The operation panel 31 has an operation substrate (not shown) arranged therein.

Figure 3:
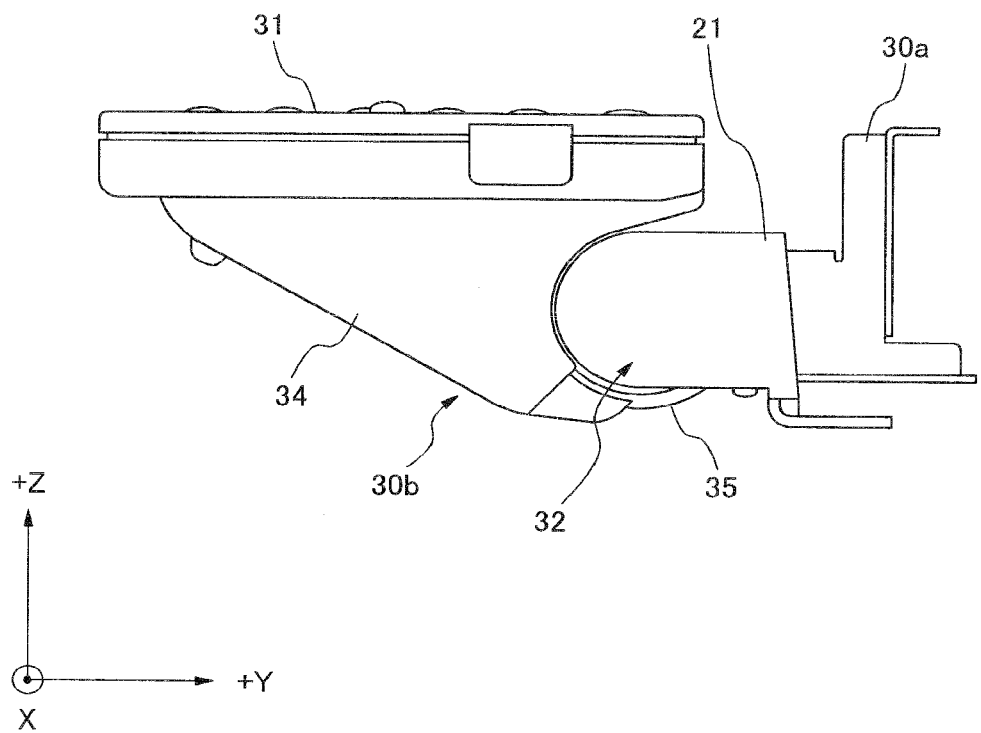
FIG. 3 is a side view of the operation panel.

FIG. 3 is a side view from the (+X) direction side in the angle adjustment device. As shown in FIG. 3, the connection portion 32 located at the end of the movable portion 30b in the (+X) direction side is covered with a connection portion cover 21. The connection portion cover 21 is detachable.

The movable portion 30b is covered with a movable portion cover 34. The movable portion cover 34 is fixed on the movable portion 30b, and covers a rear surface of the operation panel 31.

A fixed portion cover 35 having approximately semi-cylindrical shape is provided to cover the fixed portion 30a in the (−Z) direction side.

Figure 4:
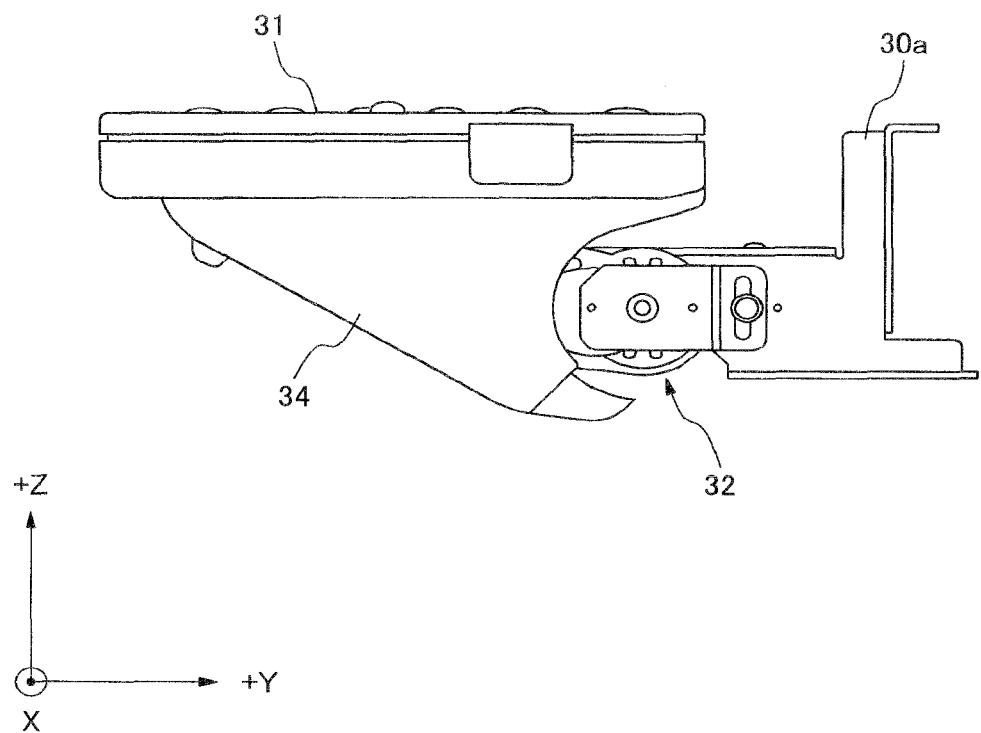
FIG. 4 is a side view of the operation panel in which a connection portion cover of the angle adjustment device is removed.

FIG. 4 is a side view of the operation panel in which the connection portion cover of the angle adjustment device is removed. As shown in FIG. 4, inside of the connection portion 32 is exposed by removing the connection portion cover 21 in FIG. 3.

Figure 5:
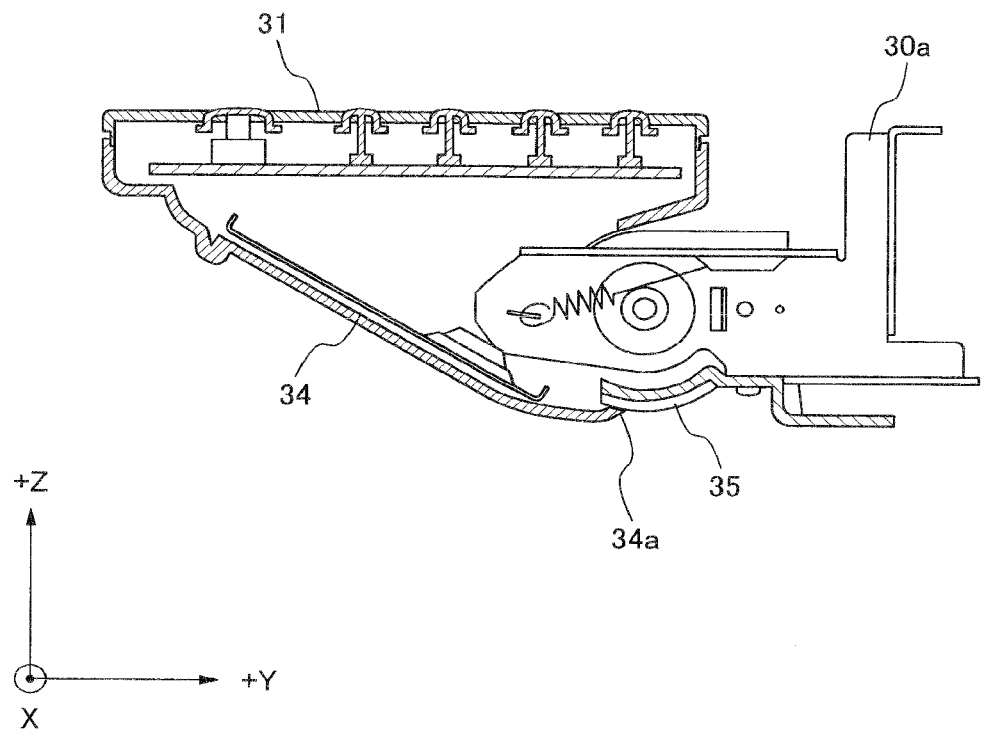
FIG. 5 is a cross section along a line A-A of the operation panel in FIG. 2.

FIG. 5 is a cross sectional view showing a cross section along a line A-A in FIG. 2. As shown in FIG. 5, an edge 34a of the movable portion cover 34 in the (+Y) direction side has contact with an outer surface of the fixed portion cover 35.

Figure 6:
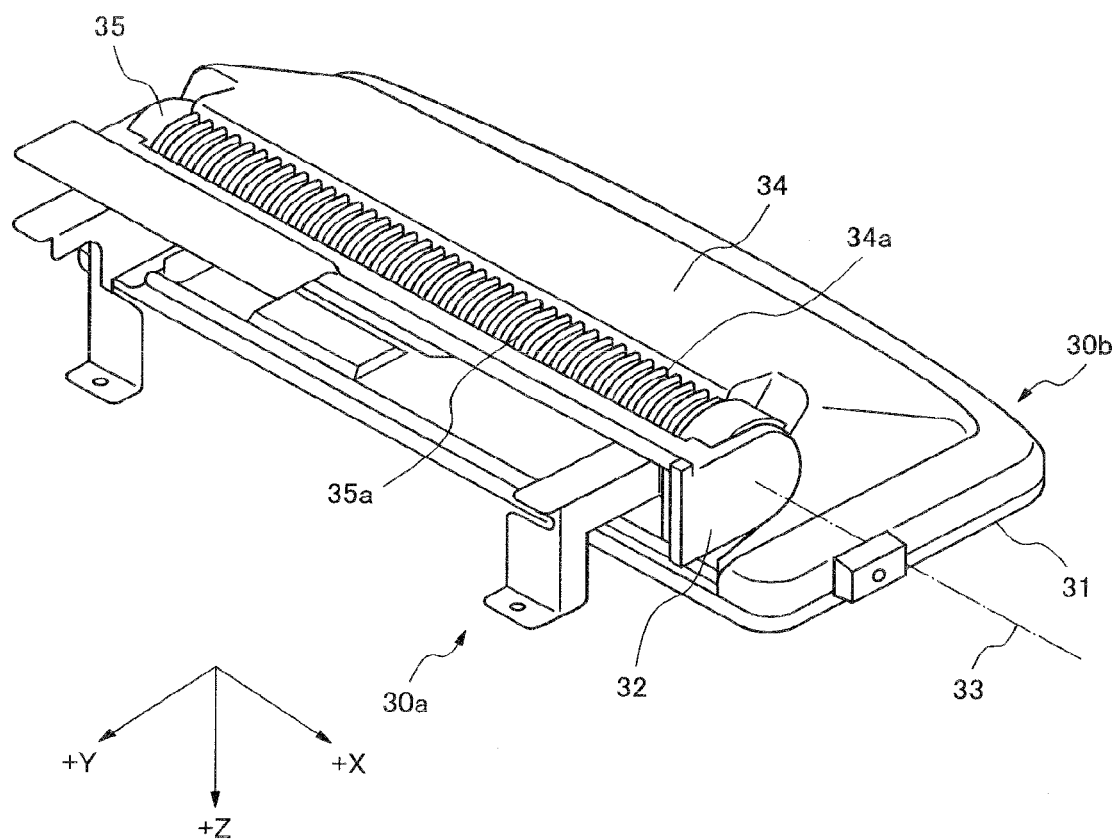
FIG. 6 is a perspective view of a rear side in the operation panel.

FIG. 6 is a perspective view of the angle adjustment device from the (−Z) direction side (a rear side of the operation panel). As shown in FIG. 6, a plurality of fixed portion cover grooves 35a with a circular arc shape of which center is located on the axis line 33 are formed on the outer surface of the fixed portion cover 35.

On the other hand, a plurality of movable portion cover projections 34a (refer to FIG. 5) which fit into a plurality of the fixed portion cover grooves 35a are provided at the edge 34a of the movable portion cover 34 in the (+Y) direction side.

Accordingly, when the movable portion 30b rotates around the axis line 33, the movable portion cover projection 34a is engaged with the fixed portion cover groove 35a, and the movable portion cover 34 moves along the fixed portion cover groove 35a. A gap between the edge 34a of the movable portion cover 34 and the fixed portion cover 35 is not generated.

Therefore, when a user changes a posture of the operation panel 31, a finger trapping accident that the user' finger is trapped in the connection portion 32 or the like can be prevented.

Next, a method for setting the posture of the operation panel 31 will be described with reference to FIG. 7A to FIG. 7D. In the second exemplary embodiment, a ratchet mechanism is adopted in the connection portion 32.

By using the ratchet mechanism, the movable portion 30b can be set at several postures. Further, the ratchet mechanism will be described in detail later.

When the user wants to change an angle of the operation panel 31, the user pushes up the movable portion 30b in the (+Z) direction. Hereinafter, the direction of pushing up the movable portion 30b is described as a forward direction R1. The direction of pushing down the movable portion 30b is described as a backward direction R2.

Figure 7A:
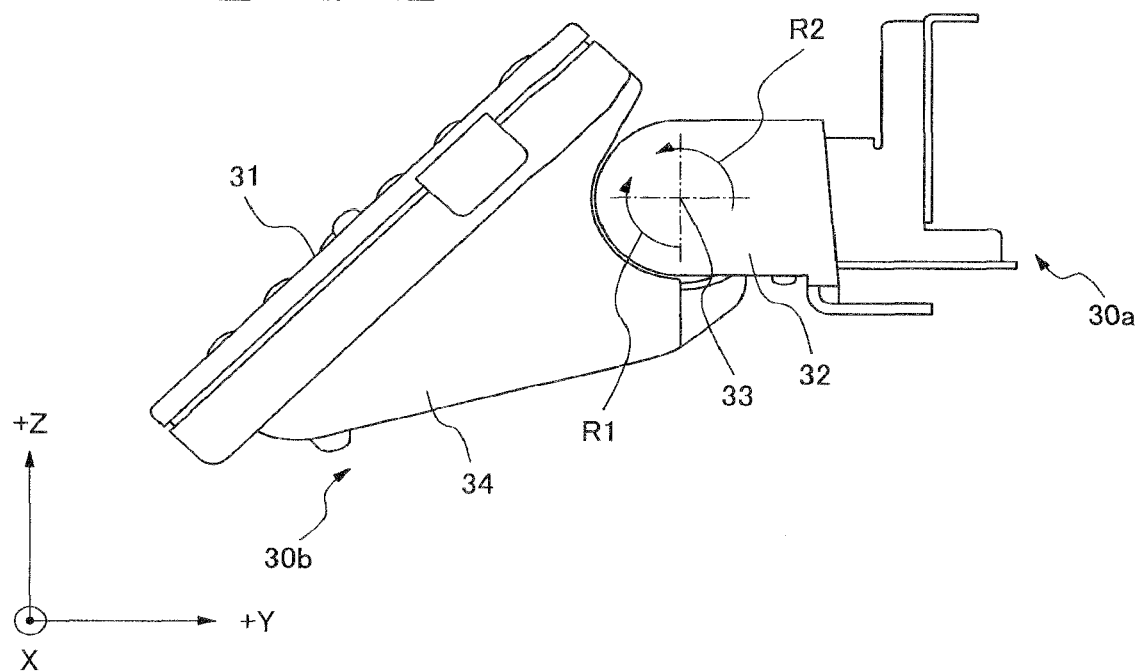
FIG. 7A is a side view of the operation panel in an initial posture position.

When the movable portion 30b is pushed up in the forward direction R1, the movable portion 30b can take three different posture positions, that are an initial posture position (FIG. 7A), a second posture position (FIG. 7B) and a third posture position (FIG. 7C).

The initial posture position is the most tilted position in the (-Z) direction of the operation panel 31. When the user wants to return the movable portion 30b to the initial posture position from the third posture position again, the user rotates the movable portion 30b in the direction R1 and pushes up the movable portion 30b to a release posture position (FIG. 7D).

When the movable portion 30b reaches the release posture position, locking of the ratchet mechanism is released and the movable portion 30b can be returned to the initial posture position.

The ratchet mechanism prevents the movable portion 30b from rotating in the backward direction R2 when a posture of the operation panel 31 is changed.

Accordingly, the posture of the operation panel 31 can be changed only by pushing up the movable portion 30b. If the locking is released by pushing up the movable portion 30b to the release posture position, the operation panel 31 and the movable portion 30b return to the initial posture position by their own weight.

Namely, the movable portion 30b rotates in the backward direction R2. Because potential energy of the movable portion 30b at the initial posture position is smaller than the potential energy at the release posture position, the movable portion 30b returns to the initial posture position by its own weight.

However, when the movable portion 30b returns to the initial posture position in a state of near free fall, an impact occurs. The impact may cause damages of the operation panel 31 or the like.

If the operation panel 31 is damaged, a commercial value of not only the operation panel 31 but also the image reading system decreases.

Then, a mechanism which generates no impact by using a spring or the like is proposed. In this case, the spring is set so that a spring force acts at least in the forward direction R1.

Accordingly, a speed at which the movable portion 30b returns to the initial posture position is reduced and occurrence of the impact is suppressed.

However, because the spring force in the forward direction R1 always acts on the movable portion 30b, the operation panel 31 may rotate in the forward direction R1 by the spring force, for example, when the user touches the operation panel 31. Thus, if the posture of the operation panel 31 is changed unnecessarily, operability of the operation panel 31 is deteriorated and commercial value of the image reading system is reduced.

In the second exemplary embodiment, the impact which is generated when the operation panel 31 returns to the initial posture position is reduced without deteriorating the operability of the operation panel 31.

Figure 8:
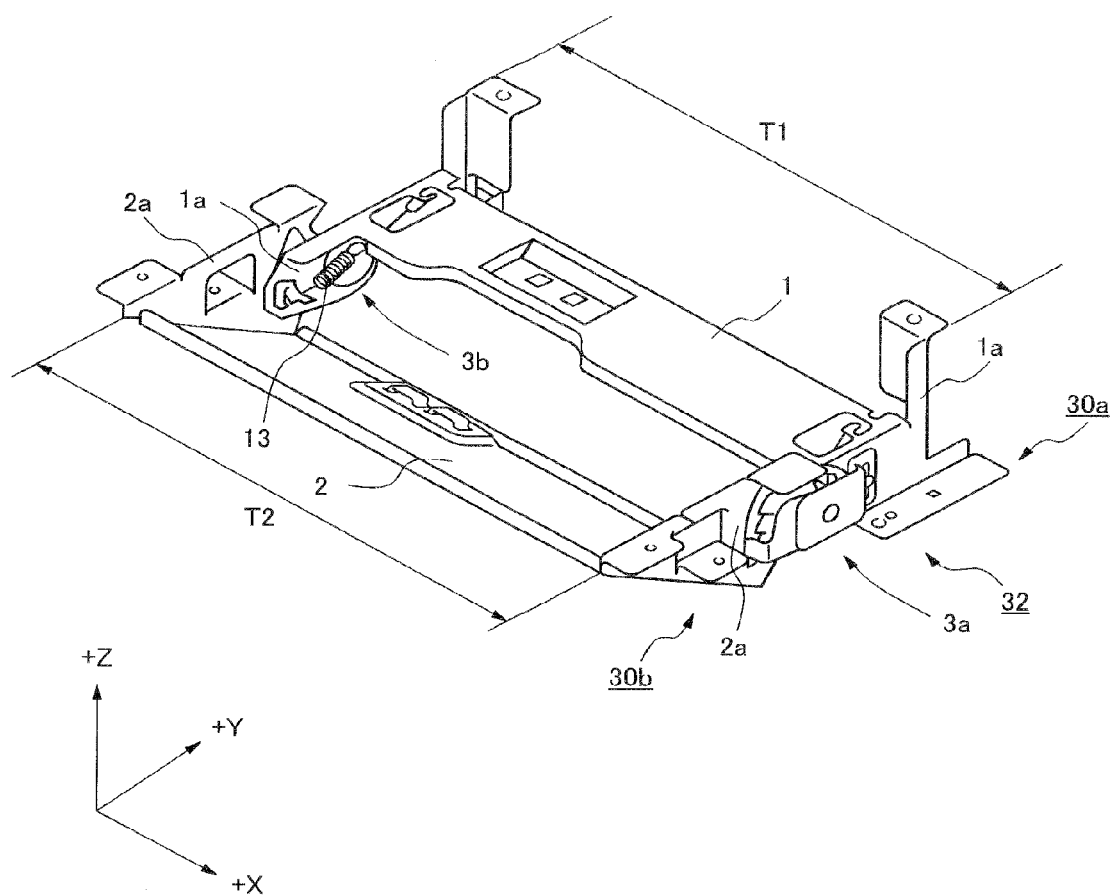
FIG. 8 is a perspective view of the angle adjustment device.

FIG. 8 is a perspective view showing an inside of the angle adjustment device according to the second exemplary embodiment.

Figure 9A:
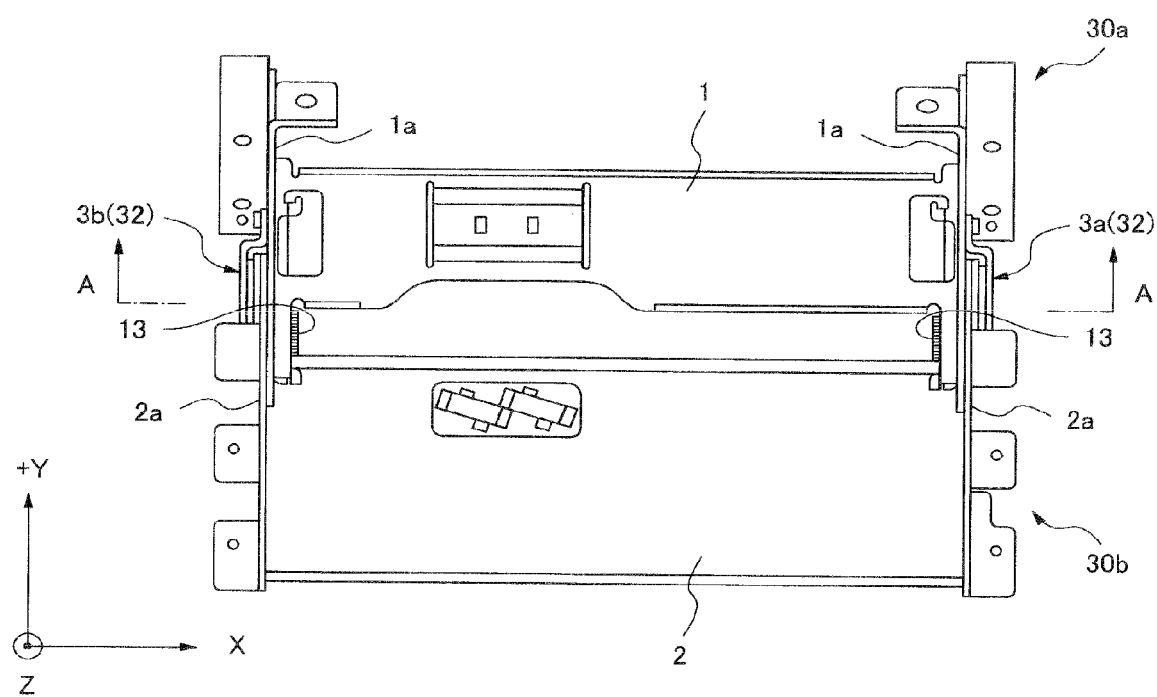
FIG. 9A is a top view of the angle adjustment device.
Figure 9B:
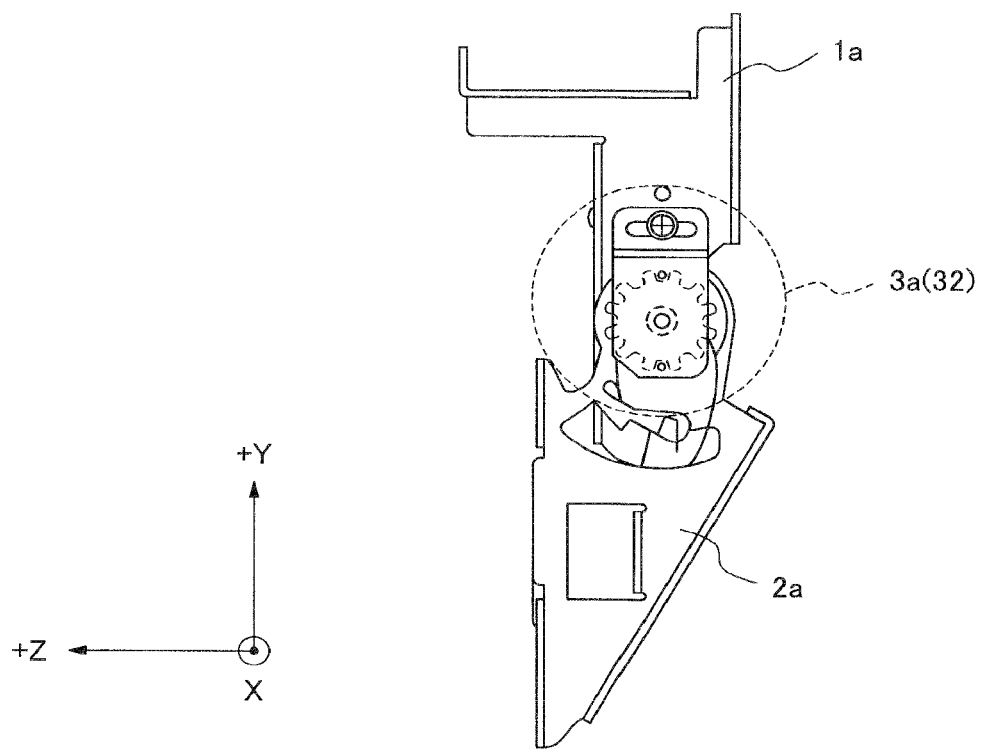
FIG. 9B is a side view of the angle adjustment device.
Figure 9C:
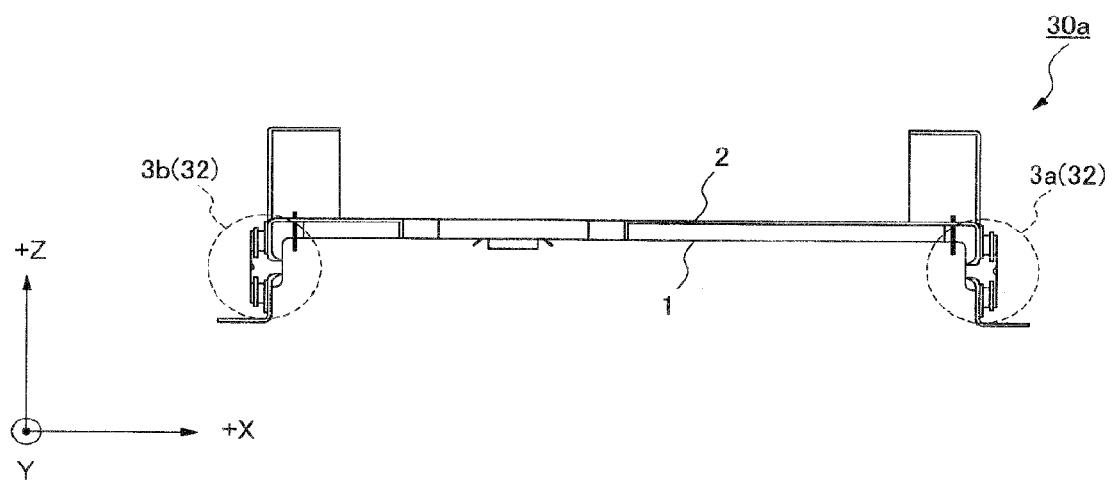
FIG. 9C is a front view of the angle adjustment device.

FIG. 9A is a top view from the (+Z) direction side in the angle adjustment device, FIG. 9B is aside view from the (+X) direction side in the angle adjustment device and FIG. 9C is a side view from the (-Y) direction side in the angle adjustment device.

As shown in FIG. 8 and FIG. 9A to FIG. 9C, the fixed portion 30a includes a fixed bracket 1, and the movable portion 30b includes a movable bracket 2. Further, the fixed bracket 1 and the movable bracket 2 are regarded as a rigid body.

The connection portion 32 includes a first connection portion 3a located in the (+X) direction and a second connection portion 3b located in the (-X) direction that connect the fixed bracket 1 with the movable bracket 2.

As shown in FIG. 8 and FIG. 9A, the connection portion 32 includes a pair of springs 13. The springs 13 are located inside the connection portion 32. One ends of these springs 13 are connected to the first connection portion 3a and the second connection portion 3b and the other ends are connected to the fixed bracket 1.

The fixed bracket 1 is provided along the X-axis, and a side plate 1a is provided at each of both ends of the fixed bracket 1. A plate surface of the side plate 1a is a plane parallel to a Y-Z plane.

The movable bracket 2 is provided along the X-axis, and a side plate 2a is provided at each of both ends of the movable bracket 2. A part of the side plate 1a overlaps a part of the side plate 2a.

In the overlap portion in which the side plate 1a of the fixed bracket 1 overlaps the side plate 2a of the movable bracket 2, the first connection portion 3a and the second connection portion 3b connect the fixed bracket 1 to the movable bracket 2.

As shown in FIG. 8, a width T1 of the fixed bracket 1 along the X-axis is narrower than a width T2 of the movable bracket 2. Therefore, the side plate 1a of the fixed bracket 1 is arranged inside the side plate 2a of the movable bracket 2.

Figure 10:
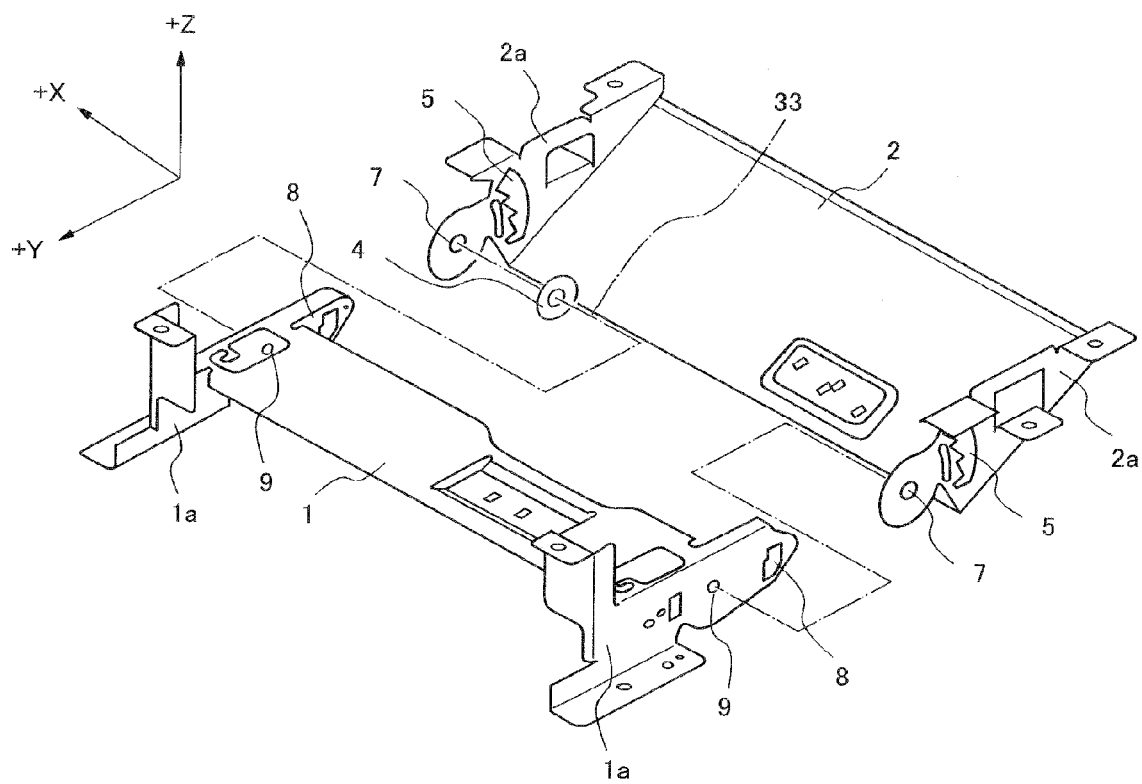
FIG. 10 is an exploded perspective view of an upper side of the angle adjustment device.

FIG. 10 is an exploded perspective view showing a configuration of the side plate 1a of the fixed bracket 1 and the side plate 2a of the movable bracket 2.

An opening 8 of the fixed bracket 1 and a burring tap 9 are formed in the side plate 1a. The burring tap 9 is a screw hole into which shaft portion of the first connection portion 3a or the second connection portion 3b is screwed as mentioned below. On the other hand, the opening 8 is an opening for setting the movable portion 30b at several positions.

An opening 5 of the movable bracket 2 and a shaft insertion hole 7 are formed in the side plate 2a of the movable bracket 2. The shaft insertion hole 7 is a hole into which the shaft portion of the first connection portion 3a or the second connection portion 3b is inserted.

When the fixed bracket 1 and the movable bracket 2 are assembled, the opening 5 is set to a position corresponding to the opening 8. As shown in FIG. 10, the fixed bracket 1 and the movable bracket 2 are connected with each other while the burring tap 9 is set to a position corresponding to the shaft insertion hole 7.

Further, an elastic member 4 such as a silicon rubber or the like is arranged between the side plate 1a of the fixed bracket 1 and the side plate 2a of the movable bracket 2 on the first connection portion 3a side. A shape of the elastic member 4 is of a washer shape and the elastic member 4 is arranged so as to have contact with plate faces of the side plate 1a and the side plate 2a.

A kinetic friction which is generated in a contact face at which the elastic member 4 and the side plate 1a of the fixed bracket 1 have contact with each other and in the contact face at which the elastic member 4 and the side plate 2a of the movable bracket 2 have contact with each other gives a braking force to rotational movement which is generated when the movable bracket 2 return to the initial posture position from the release posture position.

When the shape of the elastic member 4 is not of the washer shape, because distribution of the kinetic friction becomes non-isotropic with respect to the axis line 33, the elastic member 4 is twisted and a desired braking force may not be obtained.

However, when the shape of the elastic member 4 is of the washer shape, the distribution of the kinetic friction becomes isotropic centering around the axis line 33. Therefore, the elastic member 4 is not twisted, and the desired braking force can be obtained.

Next, a configuration of the connection portion 32 will be described with reference to an exploded perspective view shown in FIG. 11.

Figure 11:
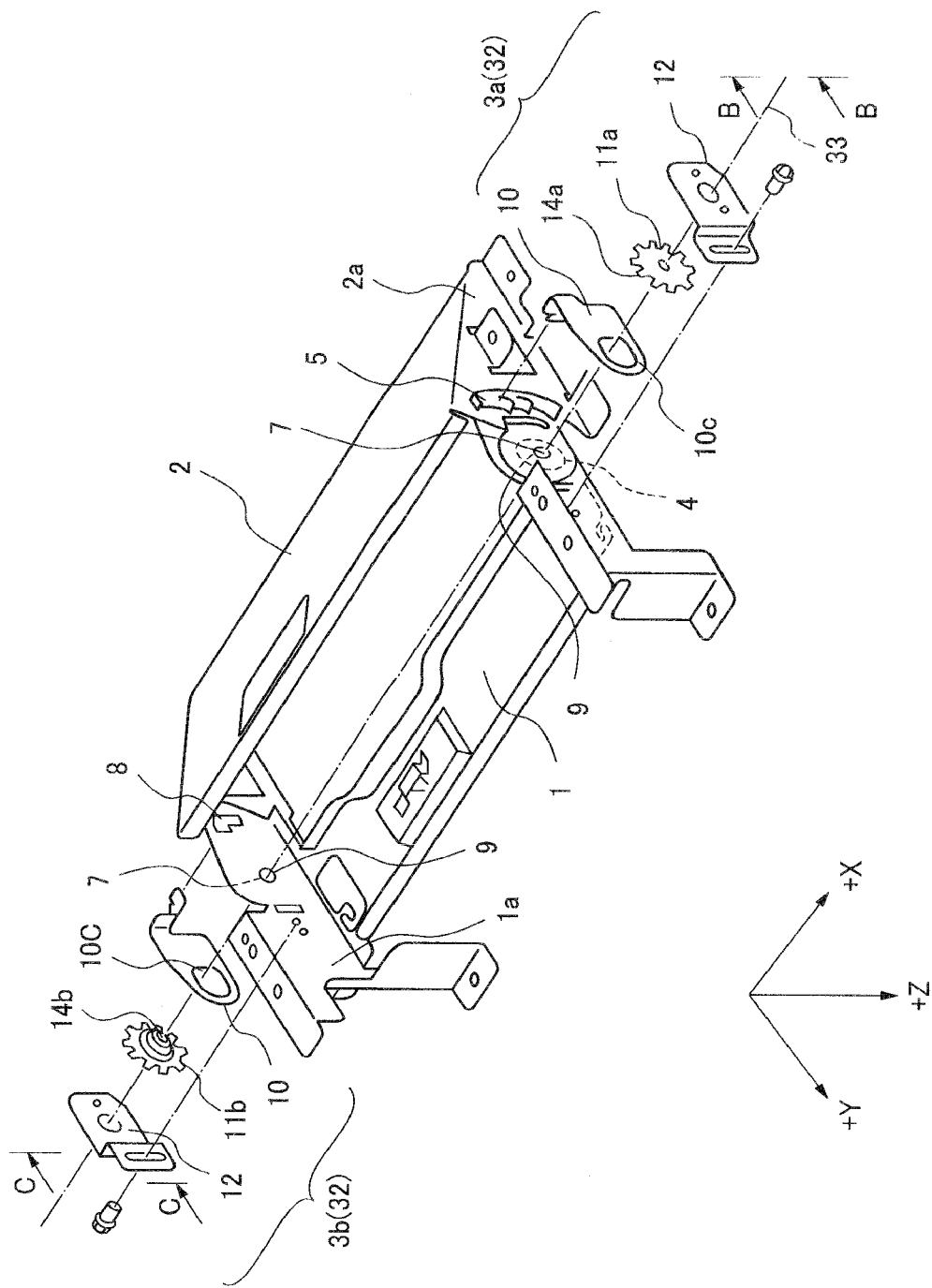
FIG. 11 is an exploded perspective view of a rear side of the angle adjustment device.

As shown in FIG. 11, the first connection portion 3a is provided in the (+X) direction side, and also the first connection portion 3a is provided in the (−X) direction side.

The first connection portion 3a to which the elastic member 4 is provided includes a lock piece 10, a shaft bracket 11a and a restriction bracket 12, and these are arranged coaxially with the axis line 33. On the other hand, the second connection portion 3b includes the lock piece 10, the shaft bracket 11b and the restriction bracket 12, and these are arranged coaxially with the axis line 33.

The lock piece 10 and the restriction bracket 12 of the first connection portion 3a have the same construction as those of the second connection portion 3b. Accordingly, the shaft bracket 11a of the first connection portion 3a is different from the shaft bracket 11b of the second connection portion 3b.

The lock piece 10, the shaft brackets 11a and 11b, and the restriction bracket 12 are arranged on an outer surface of the side plate 2a of the movable bracket 2 in this order. A shaft insertion opening 10c is provided on the lock piece 10 to configure the ratchet mechanism.

The shaft brackets 11a and 11b connect the movable bracket 2 and the fixed bracket 1 and include shaft portions 14a and 14b extending along the axis line 33, respectively. The shaft portions 14a and 14b are inserted through the opening 10c of the lock piece 10 and the shaft insertion hole 7 and are screwed into the burring tap 9, respectively. The lock piece 10, the movable bracket 2 and the fixed bracket 1 are fixed by the shaft portions 14a and 14b.

Figure 12:
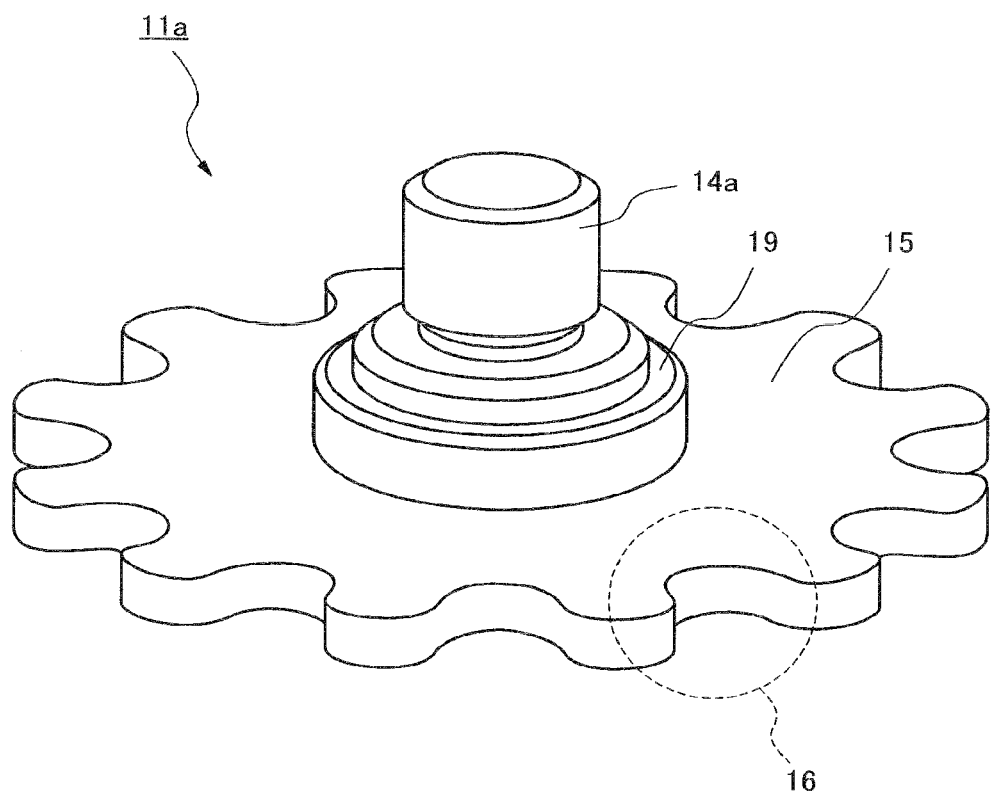
FIG. 12 is a perspective view of a shaft bracket used for a first connection portion.

FIG. 12 is a perspective view of the shaft bracket 11a. A fine pitch thread (not shown) screwed into the burring tap 9 is formed at a tip part of the shaft portion 14a, and a step part 19 is formed at a base end (root part) of the shaft portion 14a.

A plurality of tooth parts 16 for restricting rotation of the shaft bracket 11a are formed on an outer circumference of a plate portion 15.

Figure 13:
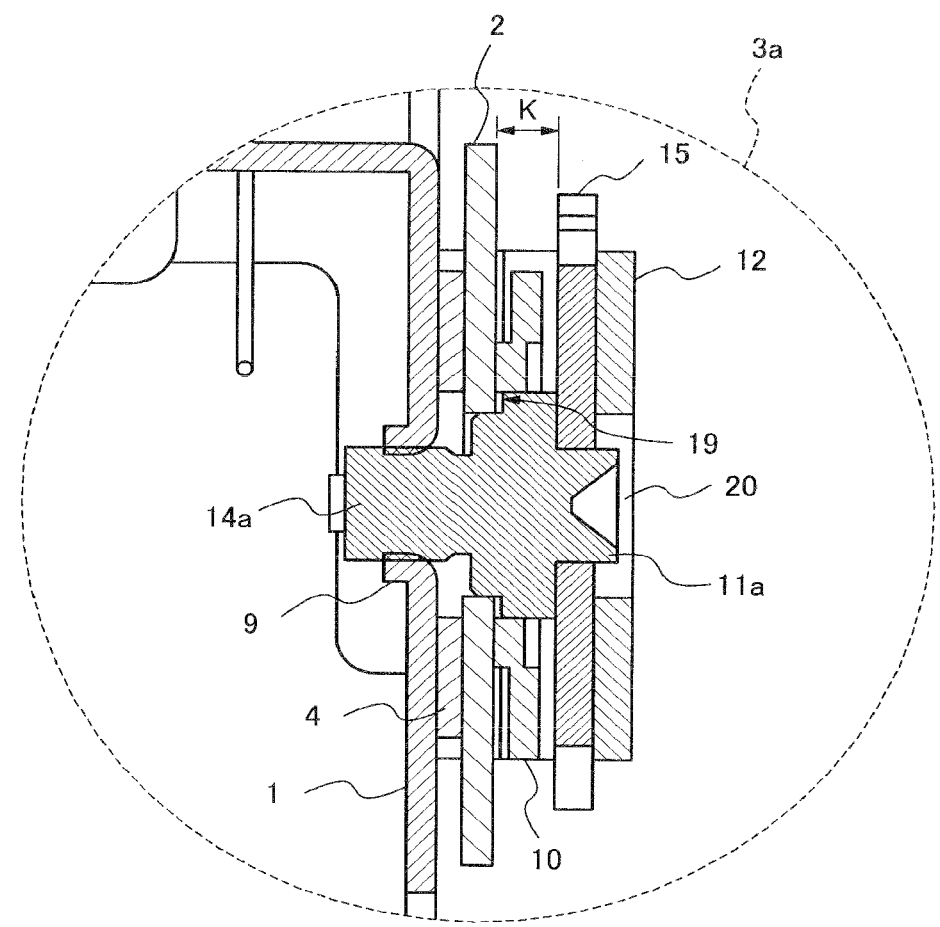
FIG. 13 is a fragmentary sectional view of the first connection portion.

FIG. 13 is a fragmentary sectional view of the first connection portion 3a along a line B-B in FIG. 11. FIG. 11 is an exploded perspective view, and FIG. 13 is a cross sectional view of the assembled first connection portion 3a.

As shown in FIG. 13, the shaft portion 14a is screwed into the burring tap 9 of the fixed bracket 1. The step part 19 touches the outer surface of the movable bracket 2.

An insertion amount of the shaft portion 14a screwed into the burring tap 9 is adjusted according to a rotation amount of the shaft bracket 11a.

Accordingly, a force with which the step part 19 pushes the movable bracket 2 can be adjusted by adjusting the insertion amount. The force with which the step part 19 pushes the movable bracket 2 is a fastening force for fastening the movable bracket 2 to the fixed bracket 1.

A compression amount of the elastic member 4 provided between the movable bracket 2 and the fixed bracket 1 varies according to the fastening force. The compression amount of the elastic member 4 corresponds to the kinetic friction generated by the elastic member 4.

Accordingly, the kinetic friction can be adjusted by adjusting the compression amount. Specifically, when the elastic member 4 is 1 mm thick, it is desirable that the compression amount of the elastic member 4 can be adjusted within a range from 0.1 mm to 0.3 mm.

The step part 19A includes a gap K formed between the movable bracket 2 and the plate portion 15 so that the lock piece 10 can move. A size of the gap K is longer than the thickness of the lock piece 10 by about 0.5 mm.

Figure 14:
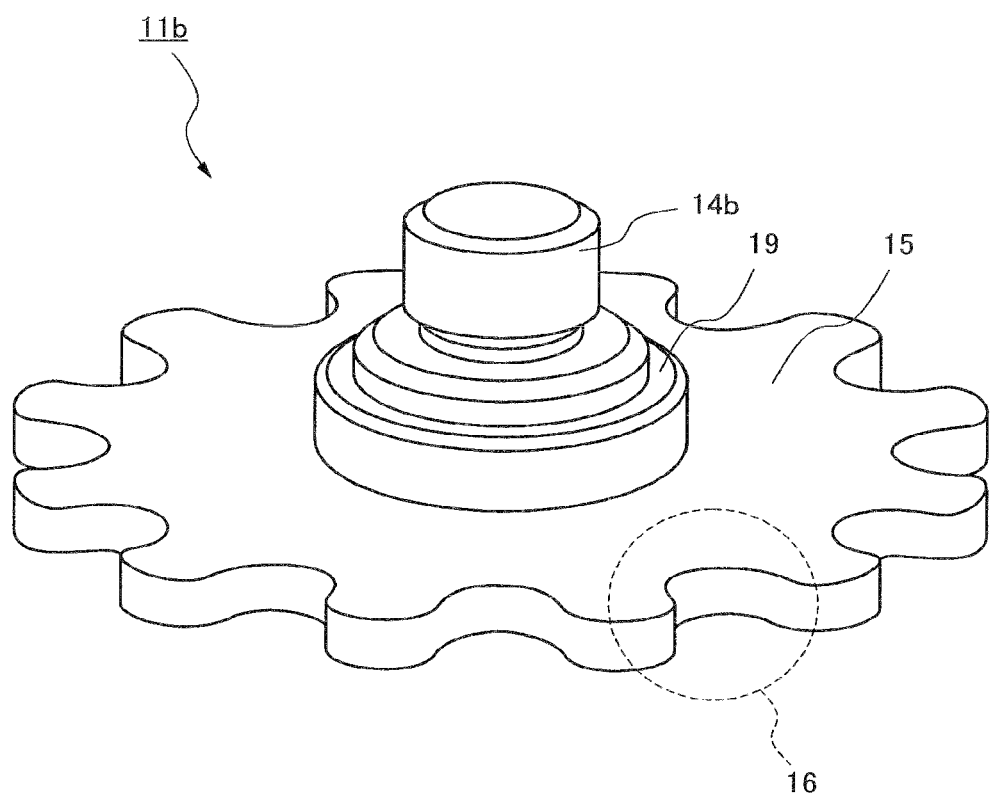
FIG. 14 is a perspective view of a shaft bracket used for a second connection portion.
Figure 15:
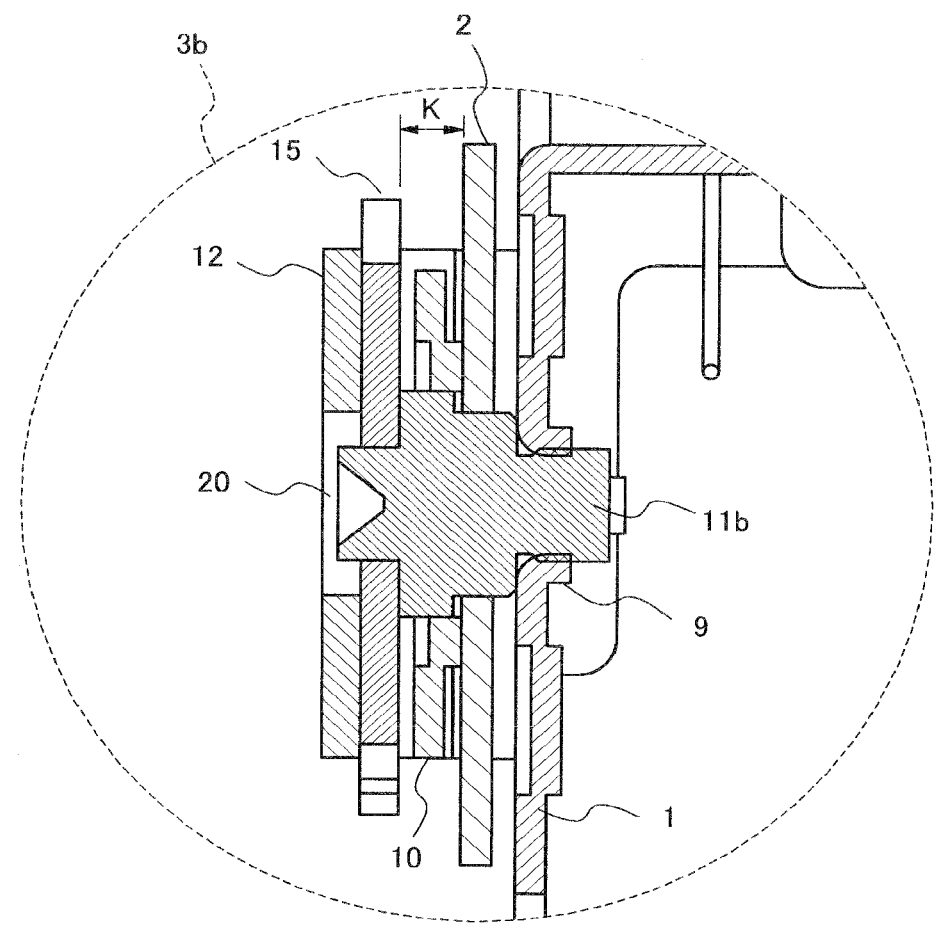
FIG. 15 is a cross sectional view of the second connection portion.

FIG. 14 is a perspective view of the shaft bracket 11b. FIG. 15 is a fragmentary sectional view of the second connection portion 3b along a line C-C in FIG. 11. FIG. 11 is an exploded perspective view, and FIG. 15 is a cross sectional view of the assembled second connection portion 3b.

The shaft bracket 11b includes a shaft portion 14b and a plate portion 15 like the shaft bracket 11a. A coarse thread (not shown) screwed into the burring tap 9 is formed at a tip part of the shaft portion 14b, and the step part 19 is formed at a base end (root part) of the shaft portion 14b.

A screw pitch formed at a tip part of the shaft portion 14a is different from that formed at a tip part of the shaft portion 14b. Therefore, the screw pitch of the burring tap 9 in the first connection portion 3a is also different from the screw pitch of the burring tap 9 in the second connection portion 3b. For the following reasons, the screw pitch of the shaft portion 14a and the shaft portion 14b are different.

As described above, the kinetic friction can be adjusted according to the insertion amount of the shaft portion 14a screwed into the burring tap 9.

In order to adjust the kinetic friction with high accuracy, the insertion amount has to be set with high accuracy. Accordingly, in order to set the insertion amount with high accuracy, the screw pitch of the shaft portion 14a is made small.

The step part 19 includes the gap K formed between the movable bracket 2 and the plate portion 15 so that the lock piece 10 can move. Furthermore, the gap K absorbs a part tolerance of an entire width dimension T2 (refer to FIG. 8) of the fixed bracket 1 and the part tolerance of an entire width dimension T1 (refer to FIG. 8) of the movable bracket 2.

Next, the restriction bracket 12 will be described. When the posture of the movable portion 30b is changed, the kinetic friction is generated between the shaft portion 14a and the movable bracket 2 due to the elastic member 4.

The shaft bracket 11a is rotated by the kinetic friction. When the shaft bracket 11a rotates, the insertion amount of the shaft bracket 11a screwed into the burring tap 9 varies. As mentioned above, because the amount of screwing has determined the braking force which acts on the moving portion 30b, a change of the amount of screwing means a change of the braking force.

If the braking force becomes large, the movable portion 30b does not move smoothly. If the braking force becomes small, when the movable portion 30b returns to the initial posture position, the impact generates. Accordingly, the rotational movement of the shaft brackets 11a and 11b is restricted by the restriction bracket 12.

Figure 16:
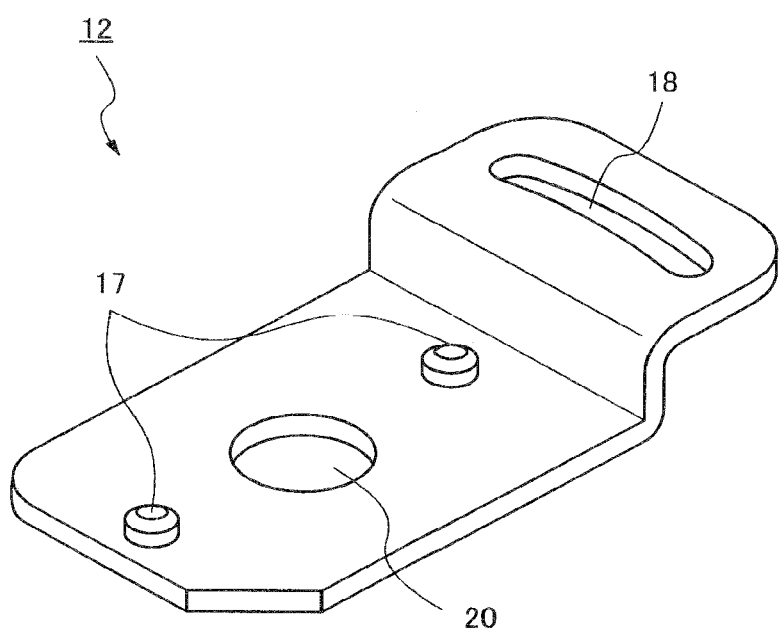
FIG. 16 is a perspective view of a restriction bracket.

FIG. 16 is a perspective view of the restriction bracket 12. The restriction bracket 12 includes two dowels 17, an opening 20 and an arch hole 18. Two dowels 17 restrict rotation of the shaft brackets 11a and 11b.

The arch hole 18 is a through hole of arch-like shape into which a screw for fixing the restriction bracket 12 on the fixed bracket 1 is inserted.

Figure 17:
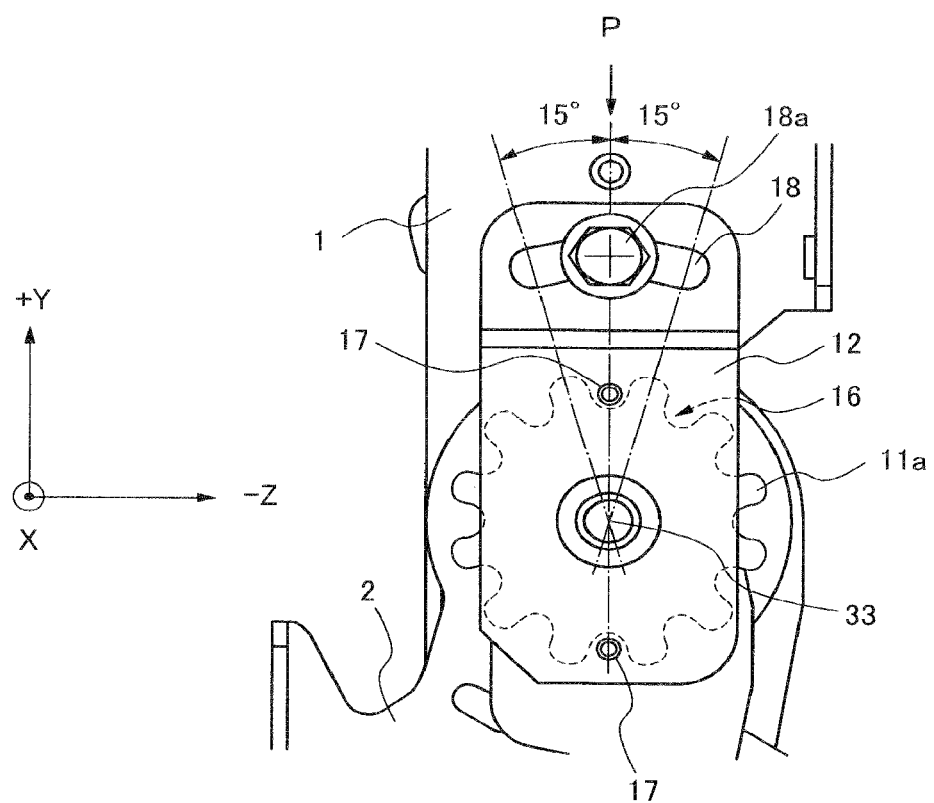
FIG. 17 is a side view showing a positional relationship among respective elements of the first connection portion.

FIG. 17 is a side view showing a positional relationship among respective elements of the first connection portion 3a shown in FIG. 11. Operations of the restriction bracket 12 of the first connection potion 3a are the same as operations of the restriction bracket 12 of the second connection portion 3b. Therefore, the operations of the restriction bracket 12 of the first connection portion 3a will be described as an example.

The tooth part 16 of the shaft bracket 11a is provided at thirty degree intervals around the axis line 33 as a center axis. The two dowels 17 provided on the restriction bracket 12 engage with the tooth part 16. Accordingly, the two dowels 17 restrict the rotation of the shaft bracket 11a.

A screw 18a is inserted into the arch hole 18 of the restriction bracket 12. The screw 18a fixes the restriction bracket 12 on the fixed bracket 1. The arch hole 18 of the restriction bracket 12 is located in the range of ±15 degrees around the axis line 33 from a reference position P.

Accordingly, the restriction bracket 12 can be rotated within the range after loosening the screw 18a inserted into the arch hole 18, and the shaft bracket 11a engaging via the dowels 17 can be rotated.

Therefore, the insertion amount of the shaft bracket 11a screwed into the fixed bracket 1, that is, the braking force against the movable portion 30b can be adjusted. Since the shaft bracket 11a is fixed by fastening the screw 18a, the adjusted braking force does not varies.

By removing the connection portion cover 21 shown in FIG. 3, the restriction bracket 12 is exposed outside (refer to FIG. 4). Accordingly, the braking force can be easily adjusted by removing the connection portion cover 21.

Next, the ratchet mechanism will be described with reference to FIGS. 18A to 18C and FIGS. 19A to 19D. The ratchet mechanism includes the side plate 2a of the movable bracket 2, the side plate 1a of the fixed bracket 1, the lock piece 10, the opening 5 of the side plate 2a, the opening 8 of the side plate 1a, the shaft portion 14a and the spring 13.

Further, since the ratchet mechanism of the first connection portion 3a has the same construction as that of the second connection portion 3b, only the first connection portion 3a is exemplified.

Figure 18A:
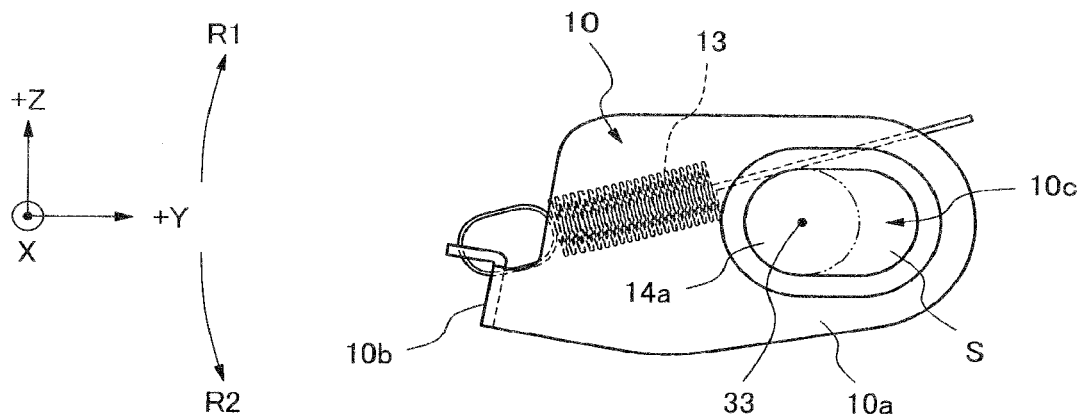
FIG. 18A is a plan view of a lock piece.

FIG. 18A is a plan view of the lock piece 10. The lock piece 10 includes a claw portion 10b, the opening 10c and a plate portion 10a. As shown in FIG. 10 and FIG. 11, the claw portion 10b is inserted into the opening 5 of the movable bracket 2 and the opening 8 of the fixed bracket 1.

The opening 10c is an elongate hole provided in the plate portion 10a. Since a major axis (Y-axis) of the opening 10c is formed so as to be larger than a diameter of the shaft portion 14a, a space S is formed in the direction of the major axis. Accordingly, the shaft portion 14a can move the distance of the space S in the Y-axis direction.

The claw portion 10b of the lock piece 10 is formed by bending an edge portion of the (−Y) direction of the lock piece 10 for the (−X) direction.

One end of the spring 13 is connected to the claw portion 10b. The other end of the spring 13 is connected to the fixed bracket 1. This spring 13 always pulls the lock piece 10 to the forward direction R1.

Figure 18B:
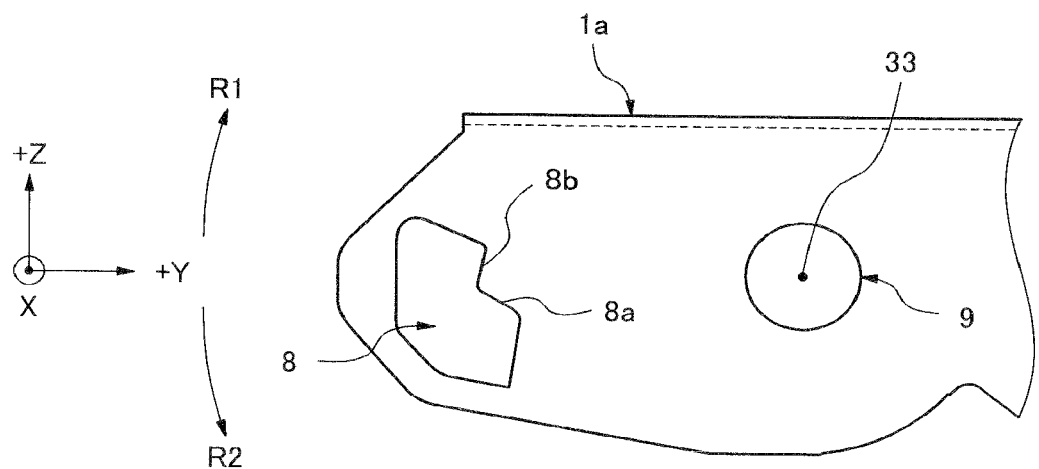
FIG. 18B is a plan view of a side plate of a fixed bracket.

FIG. 18B is an expanded plan view of the side plate 1a of the fixed bracket 1. The opening 8 of the fixed bracket 1 is provided in the side plate 1a, and a shape of the opening 8 is approximately L shape. The opening 8 includes a first contact portion 8a and a second contact portion 8b.

A distance between the second contact portion 8b and the axis line 33 is larger than the distance between the first contact portion 8a and the axis line 33.

Figure 18C:
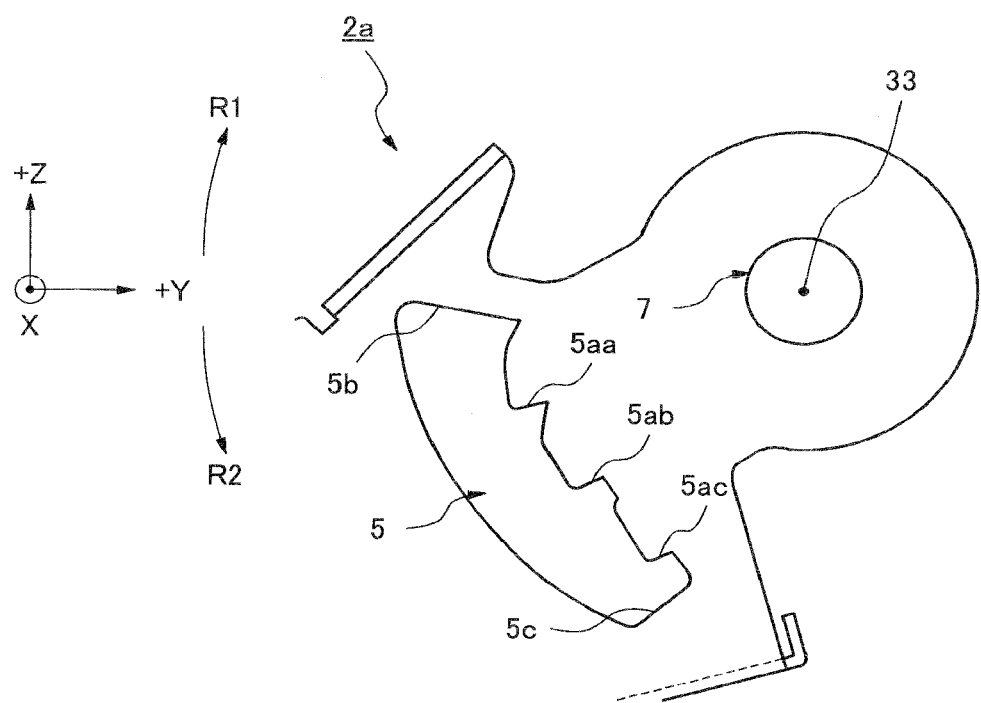
FIG. 18C is a plan view of a side plate of a movable bracket.

FIG. 18C is an expanded plan view of the side plate 2a of the movable bracket 2. As mentioned above, the opening 5 is provided in the side plate 2a. A plurality of lock portions 5aa, 5ab and 5ac to which the claw portion 10b of the lock piece 10 contacts are formed in the opening 5. The opening 5 includes an edge 5b to the forward direction R1, and includes an edge 5c to the backward direction R2.

Figure 19A:
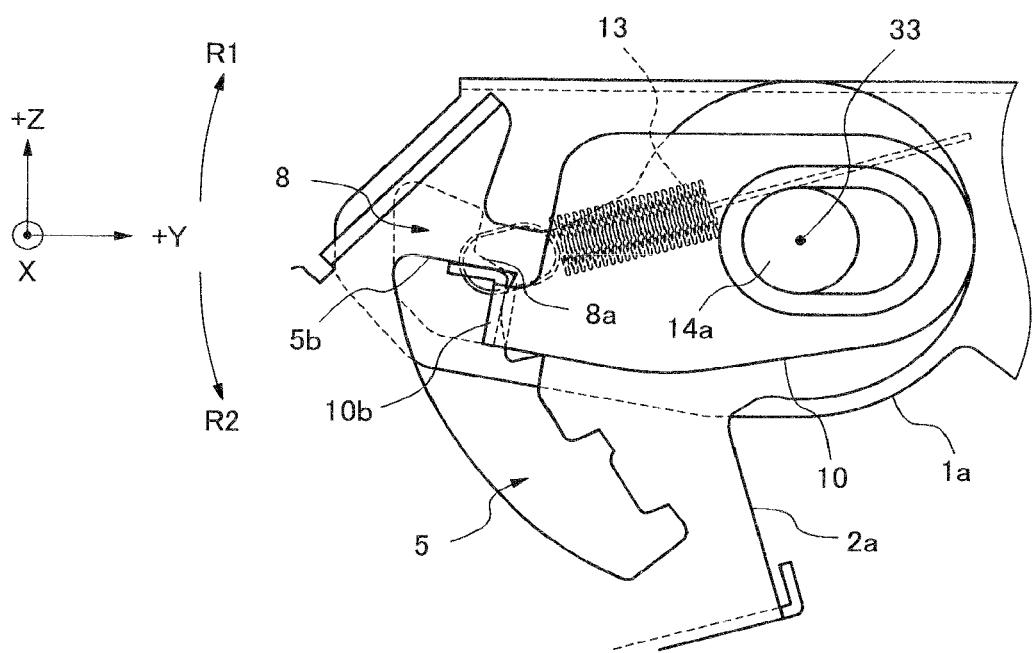
FIG. 19A is a plan view of the movable bracket located at the initial posture position.

FIG. 19A is an enlarged plan view from the (+X) direction side showing a positional relationship among the lock piece 10, the side plate 1a of the fixed bracket 1 and the side plate 2a of the movable bracket 2 when the movable bracket 2 is located at the initial posture position (FIG. 7A).

When the movable bracket 2 is located at the initial posture position, the claw portion 10b of the lock piece 10 touches the edge 5b of the opening 5 and touches the first contact portion 8a of the opening 8.

In this state, when the side plate 2a rotates to the backward direction R2, the side plate 2a cannot be rotated because the edge 5b touches the claw portion 10b.

Accordingly, when the movable bracket 2 is in the initial posture position, the movable bracket 2 can be rotated only in the forward direction R1.

Figure 7B:
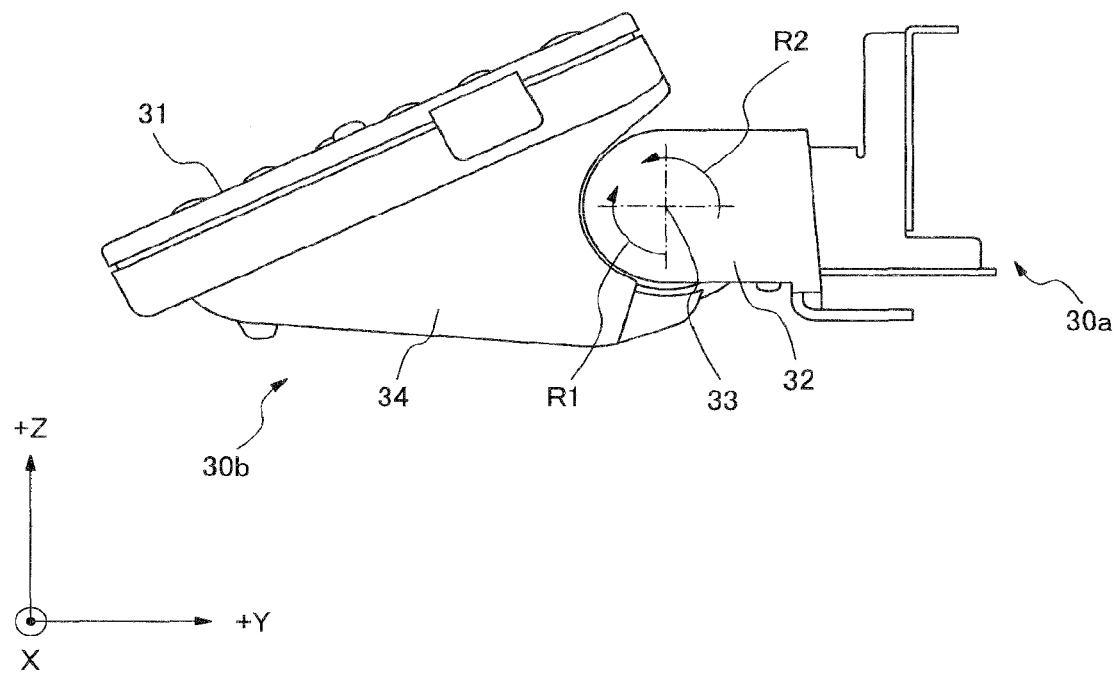
FIG. 7B is a side view of the operation panel in a second posture position.
Figure 7D:
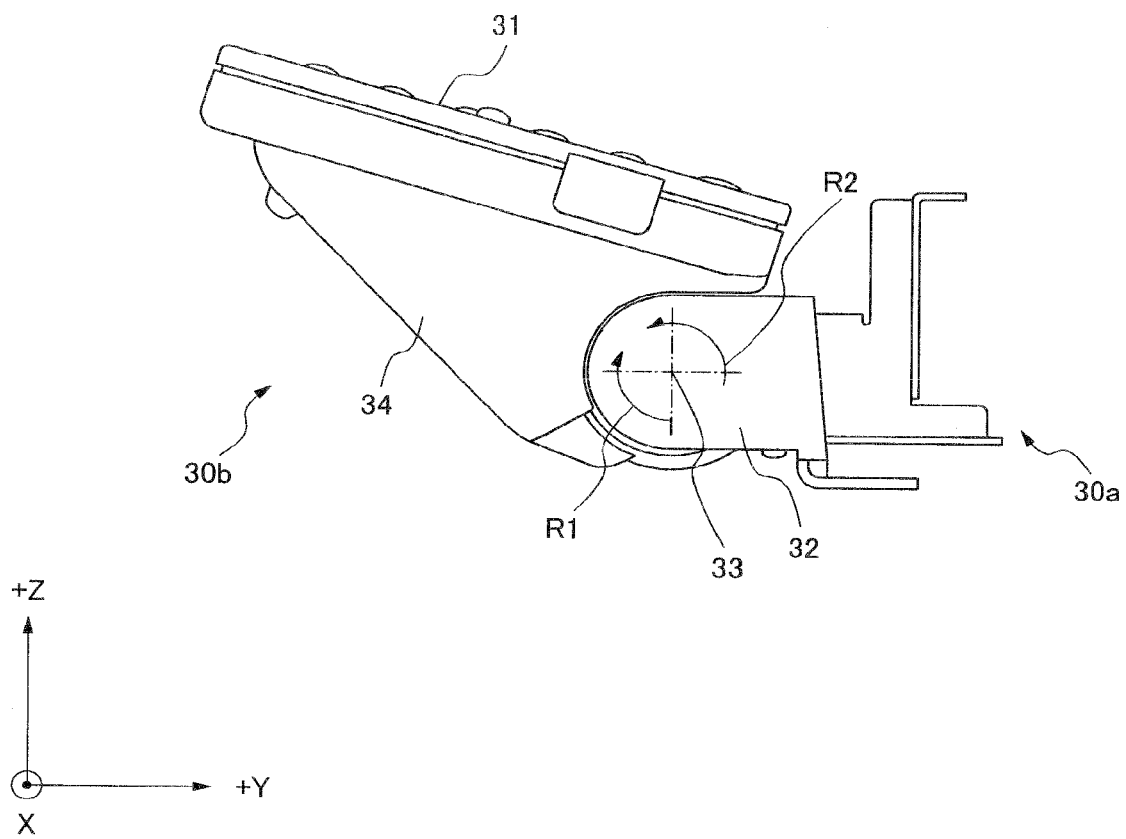
FIG. 7D is a side view of the operation panel in a release posture position.
Figure 19B:
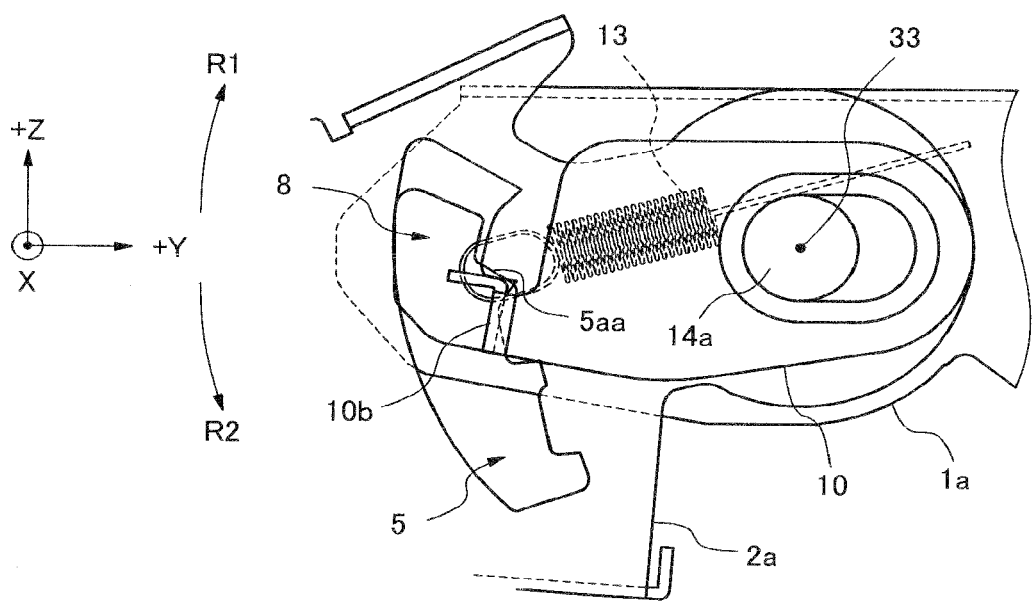
FIG. 19B is a plan view of the movable bracket located at the second posture position.

FIG. 19B is an enlarged plan view showing the movable bracket 2 which is located at the second posture position (FIG. 7B). When the movable bracket 2 is located at the second posture position, the lock portion 5aa of the side plate 2a touches the claw portion 10b.

Accordingly, the side plate 2a cannot rotate in the backward direction R2 from the second posture position.

Figure 19C:
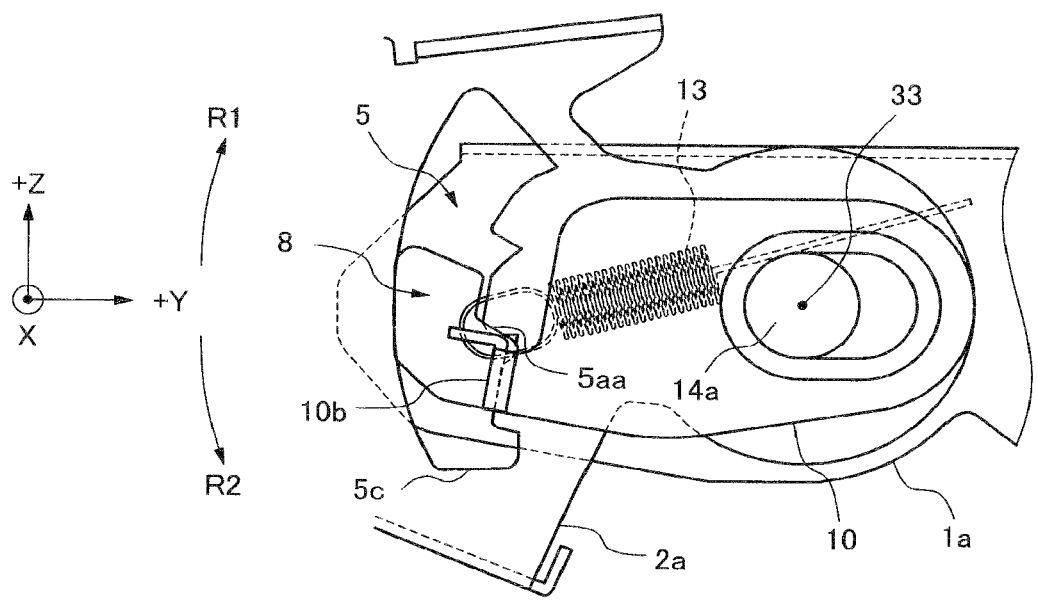
FIG. 19C is a plan view of the movable bracket located at the third posture position.

FIG. 19C is an enlarged plan view showing the movable bracket 2 which is located at the third posture position (FIG. 7C). If the movable bracket 2 is located at the third posture position, the lock portion 5ab of the side plate 2a touches the claw portion 10b.

Accordingly, the side plate 2a cannot rotate in the backward direction R2 from the third posture position.

Figure 19D:
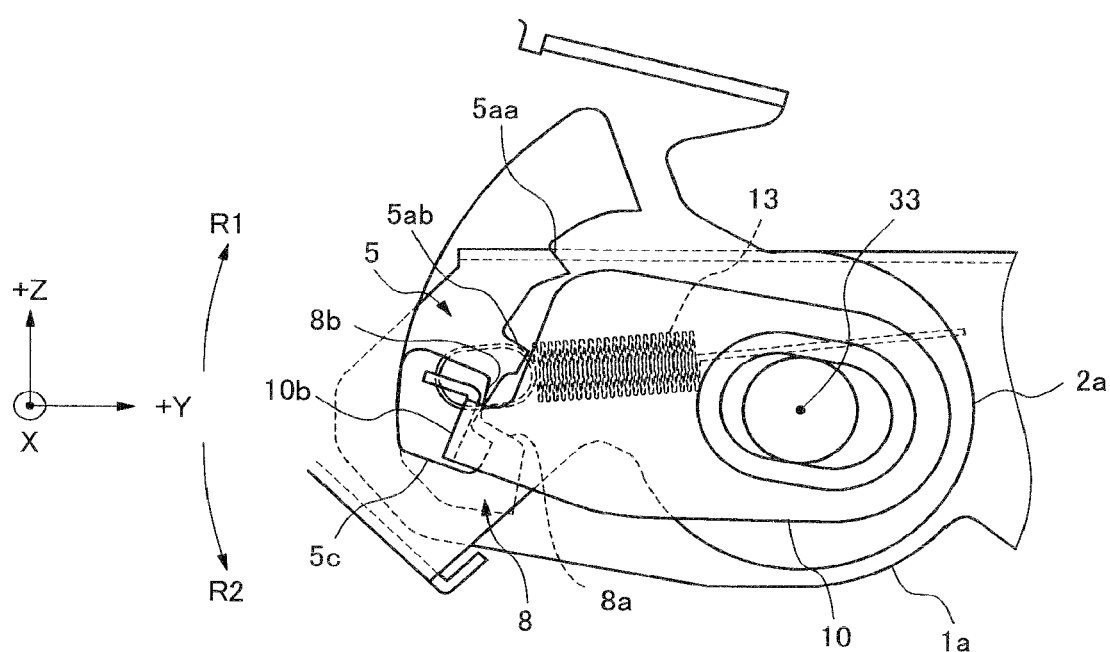
FIG. 19D is a plan view of the movable bracket located at the release posture position.

FIG. 19D is an enlarged plan view showing the movable bracket 2 which is located at the release posture position (FIG. 7D). When the movable bracket 2 is further rotated in the forward direction R1 from the third posture position, the edge 5c of the opening 5 touches the claw portion 10b.

As a result, the claw portion 10b climbs over the first contact portion 8a and moves in the (−Y) direction side, and the claw portion 10b touches the second contact portion 8b. If touching the second contact portion 8b, the claw portion 10b moves away from the axis line 33 in the space S.

Accordingly, the lock state is released, because the lock portion 5a does not touch the claw portion 10b, when the movable bracket 2 moves in the backward direction R2.

Therefore, the movable bracket 2 can return to the initial posture position due to a restoring force of the spring 13.

As described above, according to the exemplary embodiment, the elastic member 4 generates the kinetic friction when the movable bracket 2 rotates. Because the kinetic friction acts as the braking force when the movable bracket 2 returns from the release posture position to the initial posture position, the movable bracket 2 returns to the initial posture position at the slow speed.

Accordingly, an impact which is generated when the movable bracket is rapidly returned to the initial posture position is suppressed, and damage to the angle adjustment device or the like can be prevented.

When the movable bracket rotates to the forward direction, an appropriate braking force is generated by the kinetic friction which the elastic member generates.

Accordingly, the disadvantage which changes the posture of the operation panel fixed to the movable bracket only by the user touching can be prevented. And reliability of the angle adjustment device of the operation panel is improved.

In the exemplary embodiment, the braking force can be adjusted by adjusting the insertion amount of the shaft bracket.

The elastic member is made of an abrasion resistance material such as silicon rubber or the like. However, when the posture changing operation of the angle adjustment device of the operation panel is performed about 6000 times generally guaranteed, it is supposed that the braking force decreases by 10%.

In such a case, the braking force has to be readjusted. In the angle adjustment device according to the exemplary embodiment, readjustment of the braking force can be easily performed because the shaft bracket is exposed only by removing the connection portion cover.

Further, in the exemplary embodiment, the fixed bracket is integrally formed and the movable bracket is also integrally formed. However, at least one of the fixed bracket and the movable bracket can be formed by using a plurality of parts.

In the exemplary embodiment, the elastic member is provided in the first connection portion. However, the elastic member can be provided in the second connection portion.

Further, the elastic member can be provided in both the first connection portion and the second connection portion side. When the operation panel has a large width and the elastic member is provided in both the first connection portion and the second connection portion, it is advantageous that twist of the operation panel is unlikely to occur. Each member used for the exemplary embodiment can be a metal plate or made of a molding material of resin.

In the exemplary embodiment, the angle adjustment device used for adjusting an angle of the operation panel is described as an example. However, the invention can be applied to the operation panel as well as to a general mechanism which receives a downward force and needs a force to be moved upward.

<Third Exemplary Embodiment>

Next, a third exemplary embodiment will be described. An angle adjustment device according to the exemplary embodiment includes a fixed bracket, a movable bracket having a side panel corresponding to a side panel of the fixed bracket, a connection portion which connects the fixed bracket to the movable bracket so as to rotate around the axis line perpendicular to the side plate of the movable bracket and an elastic member arranged between the side plate of the fixed bracket and the side plate of the movable bracket.

The elastic member touches the side plate of the fixed bracket and the side plate of the movable bracket to generate a kinetic friction when the movable bracket rotates.

Accordingly, an impact which is generated when the posture of the angle adjustment device is changed can be suppressed. While the invention has been particularly shown and described with reference to exemplary embodiments thereof, the invention is not limited to these embodiments.

It will be understood by those of ordinary skill in the art that various changes in form and details may be made therein without departing from the spirit and scope of the present invention as defined by the claims. Further, it is the inventor's intention to retain all equivalents of the claimed invention even if the claims are amended during prosecution.

What is claimed is:

1. An image reading system, comprising:
   an operation panel with which information about at least various operations is inputted; and
   an angle adjustment device, comprising
      a fixed portion including a fixed bracket having a burring tap,
      a movable portion including a movable bracket, the movable portion being rotatable to the fixed portion,
      a connection portion which connects said fixed portion to said movable portion,
      an elastic member which is arranged between said movable bracket and said fixed bracket and restricts rotational movement of said movable portion with kinetic friction generated between said movable bracket and said fixed bracket,
      a shaft bracket including a plurality of tooth portions, the shaft bracket being configured to sandwich the elastic member and the movable bracket by the fixed bracket by screwing into the burring tap of the fixed bracket, the plurality of tooth portions being formed on an outer circumference of a plate portion of the shaft bracket, and
      a restriction bracket including at least one dowel configured to fit into and engage at least one of the tooth portions, the at least one dowel being configured to discretely restrict an insertion amount of the shaft bracket according to a rotation amount of the shaft bracket when the shaft bracket is screwed into the burring tap by the at least one dowel engaging with the at least one tooth portion during rotation of the shaft bracket,
   wherein said elastic member has a washer shape and is configured to be inserted at a central axis of said movable portion so that one side face touches said fixed bracket and another side face touches said movable bracket, the elastic member generating kinetic friction force corresponding to an amount of elastic deformation of the elastic member when the at least one dowel engages the at least one of the tooth portions during rotation of the shaft bracket, the amount of elastic deformation of the elastic member being controlled based on a fastening force to fasten the movable bracket to the fixed bracket, the fastening force being dependent on the insertion amount of the shaft portion,
   and said angle adjustment device permits a position of said operation panel to be varied by a movement of said movable portion.

2. The image reading system according to claim 1, said angle adjustment device further comprising: a ratchet mechanism which permits a motion of said movable portion in a direction of an initial posture position only when said movable portion arrives at a release posture position.

3. An image reading system, comprising:
- an operation means for informing about at least various operations is inputted; and
- an adjustment means, comprising
  - a fixed means including a fixed bracket having a burring tap,
  - a movable means including a movable bracket, the movable portion being rotatable to the fixed portion,
  - a connection means for connecting said fixed means to said movable means,
  - an elastic means for being arranged between said movable bracket and said fixed bracket and restricting rotational movement of said movable means with kinetic friction generated between said movable bracket and said fixed bracket,
  - a shaft bracket including a plurality of tooth portions, the shaft bracket being configured to sandwich the elastic means and the movable bracket by the fixed bracket by screwing into the burring tap of the fixed bracket, the plurality of tooth portions being formed on an outer circumference of a plate portion of the shaft bracket, and
  - a restriction bracket including at least one dowel configured to fit into and engage at least one of the tooth portions, the at least one dowel being configured to discretely restrict an insertion amount of the shaft bracket according to a rotation amount of the shaft bracket when the shaft bracket is screwed into the burring tap by the at least one dowel engaging with the at least one tooth portion during rotation of the shaft bracket,
- wherein said elastic means has a washer shape and is inserted at a central axis of said movable means so that one side face touches said fixed bracket and another side face touches said movable bracket, the elastic means generating kinetic friction force corresponding to an amount of elastic deformation of the elastic means when the at least one dowel engages the at least one of the tooth portions during rotation of the shaft bracket, the amount of elastic deformation of the elastic means being controlled based on a fastening force to fasten the movable bracket to the fixed bracket, the fastening force being dependent on the insertion amount of the shaft portion, and
- said adjustment means permits a position of said operation means to be varied by movement of said movable portion.

4. The image reading system according to claim 3, said adjustment means further comprising: a ratchet means for permitting a motion in a direction of an initial posture position only when said movable means arrives at a release posture position.

* * * * *